US009459106B2

(12) United States Patent
König

(10) Patent No.: US 9,459,106 B2
(45) Date of Patent: Oct. 4, 2016

(54) GENERATING ALTERNATIVE ROUTES

(71) Applicant: TomTom Development Germany GmbH, Leipzig (DE)

(72) Inventor: Felix Godafoss König, Berlin (DE)

(73) Assignee: TomTom Development Germany GmbH, Leipzig (DE)

( * ) Notice: Subject to any disclaimer, the term of this patent is extended or adjusted under 35 U.S.C. 154(b) by 88 days.

(21) Appl. No.: 14/411,625

(22) PCT Filed: Jun. 28, 2013

(86) PCT No.: PCT/EP2013/063733
§ 371 (c)(1),
(2) Date: Dec. 29, 2014

(87) PCT Pub. No.: WO2014/001549
PCT Pub. Date: Jan. 3, 2014

(65) Prior Publication Data
US 2015/0160025 A1 Jun. 11, 2015

(30) Foreign Application Priority Data
Jun. 29, 2012 (GB) .................................. 1211614.1

(51) Int. Cl.
*G01C 21/34* (2006.01)
*G08G 1/0968* (2006.01)

(52) U.S. Cl.
CPC ........... *G01C 21/34* (2013.01); *G01C 21/3415* (2013.01); *G01C 21/3446* (2013.01);
(Continued)

(58) Field of Classification Search
CPC .............. G01C 21/34; G01C 21/3415; G01C 21/3446; G01C 21/3492; G08G 1/096816; G08G 1/096822; G08G 1/096827; G08G 1/096833; G08G 1/096844
See application file for complete search history.

(56) References Cited

U.S. PATENT DOCUMENTS 5,428,545 A * 6/1995 Maegawa .......... G01C 21/3415
701/118
6,215,771 B1 * 4/2001 Turner .................... H04L 45/08
370/235
(Continued)

FOREIGN PATENT DOCUMENTS

EP  1186866 A2  3/2002
EP  1614996 A1  1/2006
(Continued)

OTHER PUBLICATIONS

Roland Bader, Jonathan Dees, Robert Geisberger, and Peter Sanders. Alternative Route Graphs in Road Networks. International ICST Conference on Theory and Practice of Algorithms on Computer Systems (TAPAS 2011). Apr. 2011, pp. 1-22.
(Continued)

*Primary Examiner* — Russell Frejd

(57) ABSTRACT

A method of generating routes in an area covered by an electronic map is described. The map comprises a plurality of segments representing navigable segments in the area covered by the electronic map, each segment being associated with jam probability data representative of a likelihood of a jam on the segment. The method involves generating a first route between an origin and a destination in the area, and generating at least one alternative route between the origin and destination using the jam probability data associated with the segments in the area. In embodiments jam and non-jam travel time data is used with the jam probability for a segment to obtain a measure of reliability of the segment under given traffic conditions, which is used to generate the alternate route(s).

15 Claims, 8 Drawing Sheets

(52) U.S. Cl.
CPC ..... *G01C21/3492* (2013.01); *G08G 1/096816* (2013.01); *G08G 1/096822* (2013.01); *G08G 1/096827* (2013.01); *G08G 1/096833* (2013.01); *G08G 1/096844* (2013.01)

(56) References Cited

U.S. PATENT DOCUMENTS

| | | | |
|---|---|---|---|
| 7,065,447 | B2 | 6/2006 | Shimizu et al. |
| 8,126,641 | B2 | 2/2012 | Horvitz |
| 8,249,810 | B2 | 8/2012 | Jones et al. |
| 8,583,363 | B2 | 11/2013 | Abraham et al. |
| 8,700,296 | B2 | 4/2014 | Chapman et al. |
| 8,987,741 | B2 | 3/2015 | Son et al. |
| 2002/0128766 | A1 | 9/2002 | Petzold et al. |
| 2004/0088392 | A1* | 5/2004 | Barrett ............... G06F 17/5009 709/223 |
| 2004/0143387 | A1 | 7/2004 | Shimizu et al. |
| 2006/0004511 | A1 | 1/2006 | Yoshikawa et al. |
| 2006/0089787 | A1* | 4/2006 | Burr .................. G01C 21/3469 701/533 |
| 2008/0004802 | A1 | 1/2008 | Horvitz |
| 2011/0295497 | A1 | 12/2011 | Abraham et al. |
| 2012/0072096 | A1 | 3/2012 | Chapman et al. |

FOREIGN PATENT DOCUMENTS

| | | |
|---|---|---|
| WO | 2008053240 A1 | 5/2008 |
| WO | 2009036844 A1 | 3/2009 |
| WO | 2012104392 A1 | 5/2012 |

OTHER PUBLICATIONS

Daniel Delling, Andrew V. Goldberg, Thomas Pajor, and Renato F. Werneck. Customizable Route Planning. Proceedings of the 10th International Symposium on Experimental Algorithms (SEA 2011). May 2011, pp. 1-12.

United Kingdom Search Report of United Kingdom application No. GB1211614.1 dated Oct. 18, 2012, 4 pages.

International Search Report of International Application No. PCT/EP2013/063733 dated Jun. 28, 2013, 3 pages.

* cited by examiner

GENERATING ALTERNATIVE ROUTES

CROSS-REFERENCES TO RELATED APPLICATIONS

This application is the National Stage of International Application No. PCT/EP2013/063733, filed Jun. 28, 2013 and designating the United States. The application claims priority from United Kingdom Patent Application No. 1211614.1 filed Jun. 29, 2012. The entire content of both these applications is incorporated herein by reference.

FIELD OF THE INVENTION

This invention relates to methods and systems for generating alternative routes, and also extends to navigation devices and servers arranged to generate alternative routes. Illustrative embodiments of the invention relate to portable navigation devices (so-called PNDs), in particular PNDs that include Global Positioning System (GPS) signal reception and processing functionality. Other embodiments relate, more generally, to any type of processing device that is configured to execute navigation software so as to provide route planning functionality, and preferably also navigation functionality. Further aspects of the invention relate to the generation of routes in general.

BACKGROUND TO THE INVENTION

Portable navigation devices (PNDs) that include GPS (Global Positioning System) signal reception and processing functionality are well known, and are widely employed as in-car or other vehicle navigation systems.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power, and optionally data signals, can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account historical, existing and/or predicted traffic and road information.

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, an on-line route planning and navigation facility is provided at routes.tomtom.com, which facility allows a user to enter a start point and a destination, whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide, the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of the current road and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the GO LIVE 1005 model manufactured and supplied by TomTom International B.V., provide a reliable means for enabling users to navigate from one position to another.

When navigating along a route, or planning a route, users may be presented with alternative routes between an origin and destination by a navigation device, or other system having route generating functionality. Rather than simply providing the user with a single route optimised with respect to time, distance or another criterion such as fuel economy, this provides the user with the opportunity to decide which of a number of possible routes they prefer for some reason. These routes would typically not be optimised with respect to the given criterion, e.g. time, but might be preferable to a user for another reason, e.g. in that they avoid a particular junction or stretch of road that the user dislikes, are more scenic, etc. A system for presenting a user with alternative route options is described in the Applicant's co-pending application entitled "Navigation Device with Alternative Navigation Instructions", published as WO 2012/034581 A1; the entire contents of which is incorporated herein by reference.

In other systems, a fastest route may be calculated between an origin and destination on the basis of current conditions. Once navigation commences, traffic conditions may change, such that the route is no longer the fastest route. In this situation, a new fastest route taking into account the actual traffic situation may be generated and proposed to a user. This may be as a result of a continual background check for faster routes under current conditions carried out, e.g. by a PND as navigation progresses, or might be in response to receiving a message indicative of a traffic event on the route ahead, e.g. via a live feed. Such methods are responsive to actual traffic conditions, simply providing a new faster route when the existing route is no longer the fastest route.

Generating and selecting alternative routes which are sensible routes a user might wish to use presents some challenges. It will be appreciated that numerous routes could theoretically be provided which differ in some respect from a reference, e.g. fastest route. Various techniques have been proposed which provide only those routes which differ appreciably from the reference, e.g. fastest route, or otherwise to provide better "quality" alternative routes. However, the Applicant has realised that there remains a need for improved methods and systems for generating useful alternate routes.

SUMMARY OF THE INVENTION

In accordance with a first aspect of the invention there is provided a method of generating routes in an area covered by an electronic map, the map comprising a plurality of segments representing navigable segments in the area covered by the electronic map, at least some, and preferably each, segment being associated with jam probability data representative of a likelihood of a jam on the segment, the method comprising:

generating a first route between a first route origin and destination in the area; and generating at least one alternative route between an alternative route origin and destination using the jam probability data associated with the segments in the area, wherein the alternative route origin is the first route origin or a location on the first route, and the alternative route destination is the first route destination or a location on the first route.

Thus, in accordance with the invention, the alternative route(s) are generated by reference to jam probability data associated with segments of an electronic map. This enables useful alternative routes to be generated by reference to the potential of segments to be affected by traffic, i.e. the jam probability of the segments, in order to provide more "jam resistant" routes. This is in contrast to merely considering current traffic conditions, reflecting the fact that traffic conditions may change rapidly between the time that a route is planned, and when navigation begins, or during actual navigation along a route. The consideration of "jam probability" provides a way of identifying routes which may be less susceptible to traffic problems, such that a user may have greater confidence that if such a route is selected, even if it is not currently the fastest route, it should at least provide a predictable and reasonable travel time in the event of changing traffic conditions. This differs from the known concept of providing a new fastest alternative route during navigation along a route, when the original route becomes affected by traffic such that the alternative route is now the fastest route under current traffic conditions. Such techniques do not take into account the potential of the alternative route to become affected by traffic at a future time.

References herein to "jam probability" or "jam probabilities" should be understood to refer to data indicative of these factors unless the context demands otherwise. The data may be in any way indicative of the probability or probabilities, as known in the art, and may be directly or indirectly indicative thereof.

The present invention extends to a system for carrying out a method in accordance with any of the aspects or embodiments of the invention herein described.

In accordance with a second aspect of the invention there is provided a system for generating routes in an area covered by an electronic map, the map comprising a plurality of segments representing navigable segments in the area covered by the electronic map, at least some, and preferably each, segment being associated with jam probability data representative of a likelihood of a jam on the segment, the system comprising:

means for generating a first route between a first route origin and destination in the area, and means for generating at least one alternative route between an alternative route origin and destination using the jam probability data associated with segments in the area, wherein the alternative route origin is the first route origin or is a location on the first route, and the alternative route destination is the first route destination, or is a location on the first route.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

The present invention is a computer implemented invention, and any of the steps described in relation to any of the aspects or embodiments of the invention may be carried out under the control of a set of one or more processors. The means for carrying out any of the steps described in relation to the system may be a set of one or more processors.

The method of the present invention is preferably implemented in the context of a navigation operation. Thus, the method is preferably carried out by a set of one or more processors of a device or system having navigation functionality. However, it will be appreciated that the methods may also be carried out by any suitable system having route generating capability, but not necessarily navigation functionality. For example, the methods may be implemented by a computer system, e.g. a desktop or laptop system, which does not have navigation functionality. A user may be presented with alternative generated routes which may then be printed or otherwise used to aid route selection at a subsequent time, or, for example, the routes may be stored for future use, e.g. downloading to a navigation device. In preferred embodiments the method of the present invention in any of its aspects or embodiments is carried out using a navigation device, and the present invention extends to a navigation device arranged to carry out the steps of the method of any of the aspects or embodiments of the invention. The navigation device may be a PND or an integrated, e.g. in-vehicle, device.

In accordance with any of the aspects or embodiments of the invention the navigation device may comprise a display for displaying an electronic map to a user, a set of one or more processors configured to access digital map data and cause an electronic map to be displayed to a user via the display, and a user interface operable by a user to enable the user to interact with the device.

In accordance with a further aspect of the invention there is provided a navigation device arranged to generate routes in an area covered by an electronic map, the map comprising a plurality of segments representing navigable segments in the area covered by the electronic map, at least some, and preferably each, segment being associated with data indicative of a jam probability representative of a likelihood of a jam on the segment, by:

generating a first route between a first route origin and destination in the area; and generating at least one alternative route between an alternative route origin and destination using the jam probability data associated with segments in the area, wherein the alternative route origin is the first route origin or a location on the first route, and the alternative route destination is the first route destination or a location on the first route.

In other embodiments the method of the present invention in any of its aspects or embodiments may be carried out by a server, and the present invention extends to a server arranged to carry out the steps of the method of any of the aspects or embodiments of the invention.

In accordance with a further aspect of the invention there is provided a server arranged to generate routes in an area covered by an electronic map, the map comprising a plurality of segments representing navigable segments in the area covered by the electronic map, at least some, and preferably each, segment being associated with data indicative of a jam probability representative of a likelihood of a jam on the segment, by:

generating a first route between a first route origin and destination in the area; and generating at least one alternative route between an alternative route origin and destination using the jam probability data associated with segments in the area, wherein the alternative route origin is the first route origin or a location on the first route, and the alternative route destination is the first route destination or a location on the first route.

Accordingly, the system or set of one or more processors of the present invention may be at least part of a server or a navigation device.

As will be appreciated by those skilled in the art, these further aspects of the present invention can and preferably do include any one or more or all of the preferred and optional features of the invention described herein in respect of any of the other aspects of the invention, as appropriate.

Of course, the steps of the method of the present invention in any of its aspects or embodiments may be carried out in part by a server and in part by a navigation apparatus. For example route generation may be carried out by a server, e.g. at the request of a navigation device, and provided to the device for output to a user. The steps of the method may be performed exclusively on a server, or some on a server and the others on a navigation device in any combination, or exclusively on a navigation device. Performance of one or more of the steps on the server may be efficient and may reduce the computational burden placed on a navigation device. Alternatively if one or more steps are performed on the navigation device, this may reduce any bandwidth required for network communication.

It should be noted that the phrase "associated therewith" in relation to one or more segments should not be interpreted to require any particular restriction on data storage locations. The phrase only requires that the features are identifiably related to a segment. Therefore association may for example be achieved by means of a reference to a side file, potentially located in a remote server.

The term "segment" as used herein takes its usual meaning in the art. A segment may be a navigable link that connects two nodes, or any portion thereof. While embodiments of the present invention are described with reference to road segments, it should be realised that the invention may also be applicable to other navigable segments, such as segments of a path, river, canal, cycle path, tow path, railway line, or the like. For ease of reference these are commonly referred to as a road segment, but any reference to a "road segment" may be replaced by a reference to a "navigable segment" or any specific type or types of such segments.

It will be appreciated that jam probability data need not be associated with each segment in the area of the electronic map, although this is preferably the case, provided that jam probability data is associated with at least some of the segments, i.e. the plurality of segments, referred to herein. In order to be useful in generating the alternative routes, jam probability data should be associated with at least some, and preferably all, of the segments which are taken into consideration when generating a route between the origin and destination, e.g. being part of a so-called "routing corridor".

In embodiments of the invention, a single alternative route or a plurality of alternative routes may be generated. The alternative route(s) may be referred to as a set of one or more alternative routes. Any of the discussion herein regarding the generation of an alternative route or routes is applicable to any one or ones or each alternative route generated.

In preferred embodiments the method further comprises providing information indicative of the at least one generated alternative route to a user. This may involve outputting the route or information indicative thereof to a user. The information may be in any way indicative of the route, e.g. a set of instructions, which may be audible or visual, but preferably is a visual representation of the route. In preferred embodiments, the method comprises displaying the route(s) to a user. However other forms of output may be used. For example the method may alternatively or additionally comprise printing information indicative of the at least one route. Preferably the information indicative of the route is output to a user via a navigation device, but in other embodiments the information may be output by any suitable processing device, e.g. by being displayed by a computer apparatus having route generating capability but not necessarily navigation capability, etc. This may be relevant where the route is generated by a server. In preferred embodiments, regardless of whether the at least one alternative route is generated by a navigation device such as a PND or integrated, e.g. in-vehicle, navigation device, the information indicative of the route(s) is output to the user by such a device. For example, the generation of the route may be carried out by a remote server and information indicative thereof provided to a navigation device for output to a user. In preferred embodiments, wherever the route(s) are generated, a step of displaying the route(s) may comprise superposing the or each route on the electronic map. In embodiments the information indicative of the alternative route(s) is provided to a user before a current position of the user reaches the origin of the alternative route(s) during navigation along a predetermined route. This provides time for the user to decide whether to follow the route. The current position of the user may correspond to a current position determined by a navigation device, e.g. PND or integrated device, associated with the user, e.g. being located in a vehicle of the user.

Preferably the method further comprises providing information indicative of the first generated route to a user. This may be carried out in any of the manners described by reference to the at least one alternative route. In embodiments the method comprises outputting, e.g. displaying the first generated route to the user, and preferably also the at least one alternative route, preferably wherein the first and the at least one alternative route are output, e.g. displayed simultaneously to a user, e.g. by displaying the routes together on the electronic map.

In embodiments the method comprises providing additional information relating to the at least one alternative route to the user. The information may include an expected travel time and/or traffic information for the or each route. In embodiments the information is provided by, e.g. displayed, by a navigation device. In preferred embodiments corresponding information is provided relating to the first generated route. This may facilitate comparison of the routes. In these embodiments, the user is provided with information enabling them to make an informed decision regarding selection of an alternative route, or, indeed, to ignore the alternative route(s) and continue on a first route.

Alternatively or additionally, the method may comprise storing the at least one generated alternative route, and optionally the first generated route.

In embodiments, the method may further comprise receiving an indication of a selection of the or an alternative route from a user. The selection may be indicative that the user wishes to navigate the selected route. For example, the user may select the or an alternative route via a suitable user interface, e.g. of a navigation apparatus, or associated with a computing apparatus providing route generating functionality. If only one alternative route is provided, the user may still specify that they wish to use the alternative route rather than the first route. Of course, when presented with the alternative route(s), the user may decide nonetheless to use the first generated route. However, the present invention provides the user with the opportunity to reassure themselves that they have considered alternative options and made a positive decision to use the first generated route.

The method may further comprise providing a set of navigation instructions for guiding a user along a given alternative route. The instructions may be visual, audible or haptic instructions, or combinations thereof as known in the art. This applies to any reference to navigation instructions herein. The route is preferably a user selected route. The navigation instructions may be provided to a user via a navigation apparatus, or may be otherwise output to the user, e.g. by a computer apparatus which provides route generation functionality displaying the instructions, or printing the instructions, etc. The instructions may be provided in response to a user selection of an alternative route.

Exemplary methods of presenting alternative routes to a user can be found in WO 2012/034581 A1 mentioned above.

Preferably the alternative route(s) are generated automatically, i.e. without user intervention.

The step of generating the one or more alternative routes may be implemented at any stage, and may be implemented before or during navigation along a route. For example, the alternative route(s) may be generated together with the first route at the start of a route planning operation by a navigation device or other route planning system. In these embodiments the first route origin and destination may correspond to the alternative route origin and destination. A user may then decide whether to follow the or an alternative route once navigation commences in preference to the first generated route. As set out above, the present invention is not limited to an implementation by a system that has navigation capability, and the alternative route(s) may be generated by a route generation system for evaluation by a user, such that the routes might be used subsequently in a navigation operation, or might simply be reviewed by the user without being then used in route navigation. The user might, for example, print or save the route(s) for later use.

However, the present invention is advantageously implemented "on the fly". In these embodiments the alternative route(s) may be referred to as "en route alternative route(s)". As the alternative route(s) are generated in accordance with the invention in a manner which takes jam probability into account, they are particularly useful in identifying suitable alternative routes in the light of a given traffic situation, e.g. on an initial route. The present invention provides the ability to generate alternative routes that can be expected to be resistant to the effects of traffic, and therefore is most advantageously employed once a journey is underway, e.g. if an initial route turns out to be adversely affected by traffic. Thus, in preferred embodiments the alternative route(s) are generated on the fly and/or during navigation along the first route. The first route is then a predetermined route being navigated. The method may further comprise providing a set of navigation instructions for guiding a user along the first route.

In embodiments, the alternative route(s) may be generated during travel along the first route, e.g. when a problem is identified with the first route being navigated, such as a traffic incident, adverse weather, etc, or in response to a user input requesting the generation of one or more alternative routes. A user may decide for numerous reasons that they would like to see if other suitable alternative routes exist after travel along a route has commenced. Preferably the alternative route(s) are not generated by reference to live traffic data. In other words the route(s) are not generated responsive to traffic on the first route. The generation of the alternative route(s) may occur automatically or in response to a user input. In some preferred embodiments, as discussed in more detail below, the alternative route(s) are generated automatically in relation to a decision point or points along a first route being navigated. In these embodiments, the route(s) are generated automatically as a background task during navigation along the first route, in a similar manner to that in which new "fastest" routes are generated in conventional systems during navigation along a predetermined route.

The first route and the or each alternative routes are each routes between a respective given origin and destination. The first route and alternative route origin may be the same or different to one another. Likewise, the first route and alternative route destination may be the same or different to one another. The first route and alternative route origin and destination may be selected as desired, and may be user specified or automatically selected, or combinations thereof.

Where the alternative route(s) are generated prior to navigation along the first route, the alternative (and first route) origin and destination will typically be specified by the user in a conventional manner at the start of the route planning process. In these embodiments in which the first and alternative routes are generated prior to navigation along the first route, the first and alternative route origin and destination are typically the same. It will be appreciated that the first route may alternatively be generated during travel along another predetermined route, with the first and alternative route destination and origin still being the same. For example, the first route might be generated in relation to a first route origin which is itself located on a predetermined route being followed. The first route may then provide a continuation to the predetermined route e.g. an extension of the predetermined route, or a modified remainder or section of the predetermined route which becomes a new route to be followed. In these situations the first route origin might be automatically selected. The first and alternative route origin may then be a position at or ahead of a current position along a predetermined route.

In preferred embodiments in which the alternative route(s) are generated during travel along the first route, at least the alternative route origin may be automatically selected. The alternative route destination may or may not be user specified.

In other arrangements, the first route and alternative route(s) may be generated during navigation along a predetermined route, with the origin for the first route and alternative route(s) being a position along the predetermined route. In these arrangements the first route may be a continuation of the predetermined route, or a modification of a remainder of the predetermined route, etc.

Preferably the first route is a predetermined route being navigated. References to a route being navigated may be understood in the usual sense in the art to refer to a route along which a user is being guided, e.g. by a navigation device, and preferably in relation to which navigation instruction(s) are being provided. These may be in the form of a display of the route, typically in combination with a set of one or more instructions indicative of, e.g. manoeuvres and other action to be taken by the user to follow the route, which may be given audibly and/or visually. The predetermined route refers to the route being travelled at the time the alternative routes are generated or at least provided to a user. In these embodiments the alternative route origin is preferably a position along the first route, i.e. the route being navigated. Thus the alternative route and first route origins will differ. The first route origin may be an origin originally specified in the route planning process prior to commencing travel, e.g. by a user. The alternative route origin is preferably a position at or ahead of a current position (of a user or navigation device) along the first route, i.e. the predetermined route being navigated. In preferred embodiments the alternative route origin is a decision point along the first route. A decision point is a point at which a routing choice must be made. Preferably the method comprises generating the alternative route(s) in response to a determination that a current position of a user is within a predetermined distance of a decision point along the first route.

In embodiments information indicative of the alternative route(s) is provided to a user before a position of a user reaches the origin of the alternative route(s), e.g. before a decision point used as the origin is reached. By determining the alternative route(s) ahead of such a decision point, a user may easily decide to follow one of the routes without needing to turn around or cut across the road network along minor roads. A decision point may be defined by a node having more than one outgoing segment. In these embodiments, as the user navigates along the first route, the method is used to generate one or more alternative routes from a given position, i.e. alternative route origin along the route.

The alternative route destination may be the destination of the first route, i.e. predetermined route being followed, or a position along the first route between the alternative route origin and the first route destination. For example, the user may subsequently rejoin the first route such that the destination of the first route and the destination used in generating the alternative route is different. In these embodiments the first route destination may be specified when originally planning the first route, e.g. prior to commencing travel, such as by a user. In some embodiments the alternative route destination is automatically selected.

It has been found that by generating alternative route(s) in relation to decision points along a route being followed by a user based on jam probabilities, the present invention provides an effective way to communicate options to the user in relation to an overall traffic situation in the area, particularly where traffic information or timings for the alternative route(s) is provided. These embodiments provide a user with relevant information regarding realistic alternative route options, rather than simply providing details of current route, and possibly a given faster route under current conditions, but without overloading the user with information, e.g. by providing details of traffic on all nearby roads.

In embodiments in which the present invention is implemented during navigation along a first predetermined route, the first route may be generated before the one or more alternative routes are generated.

It will be appreciated that in these preferred embodiments a set of one or more alternative routes may be generated repeatedly during travel along a predetermined first route. Thus the steps of the method may be repeated once or a plurality of times during travel along the first route. For example, the method may be carried out at a plurality of successive decision points along the first route being followed. In the event that a user chooses an alternative route during travel along a predetermined route, the alternative route may become a new first route for generation of subsequent alternative routes.

The at least one alternative route generated is alternative in that is an "alternative" to the first generated route, or at least a part thereof. In some embodiments the first route is generated and preferably provided to a user before the at least one alternative route is generated and preferably provided to a user. As described above, in preferred embodiments the first route is a predetermined route being navigated. However, in other embodiments the first and alternative routes could be generated, and preferably output together.

It will be appreciated that in addition to generating alternative routes in any manner described herein, the present invention may further comprise generating a new optimal route, e.g. fastest route in the event of traffic being present along the current route being followed in addition to the or each alternative route between the alternative route origin and destination. In other words, even if an expected fastest or optimal route is being followed, an optimal or fastest route may be generated in respect of the origin and destination used for the alternative routes. This provides a way of checking that the existing route is still a fastest or optimal route. In these embodiments, if an optimal route is determined between the alternative route origin and destination, this route may provide a "first route", between the same origin and destination as the alternative route. This first route may correspond to a remainder of a predetermined route already being followed, or could be a new route, if the original route is no longer an optimal route.

In embodiments the first generated route is a route that is optimised with respect to at least one given criterion, and the at least one alternative route is not optimised with respect to the at least one criterion. In preferred embodiments the criterion is time. In other words, the first generated route is a fastest route between the first route origin and destination and the at least one alternative route is not a fastest route between the alternative route origin and destination. The relevant portion of the first generated route may also be a fastest or optimal route between the alternative origin and destination. It will be appreciated that references to a route being "optimised" herein mean that the route is optimised as far as possible, given any other constraints, with respect to the given criterion, between the relevant origin and destination. For example, a route may be optimised with respect to time but subject to other constraints such as a specification that motorways are to be avoided. The optimisation will typically be by reference to a given time which may be a current time (or as near thereto as possible given the slight delay required to receive and process information, e.g. relating to traffic conditions, which may affect the travel time along the route), a time at which the route is to be travelled, or at which time the route is generated. The at least one alternative route is not optimised with respect to the given criterion at least relative to the first generated route. It will be appreciated that the alternative route(s) are therefore sub-optimal relative to the first generated route with respect to the at least one criterion. This will be by reference to the coextensive portions of the routes, where the origin and/or destinations of the routes differ. The creation of the alternative routes recognises the fact that users may be interested in such "sub-optimal" routes for a variety of reasons. For example, where a user is travelling in an area familiar to them, they may believe that they know of a better or more interesting route according to their own personal preferences, and wish to have the opportunity to select such a route, or at least make a positive decision as to whether to stay with the "optimal" route. While in preferred embodiments the first criterion is time, being particularly relevant in the context of alternative routes which take into account a jam probability, it is envisaged that other criterion could be used alternatively or additionally, such as distance, fuel economy, or indeed any other attribute by reference to which routes are conventionally generated. These are attributes which may be assigned to segments and minimised when determining a route in a cost function to provide a "least cost route". Thus, in general, the first route is preferably a least cost route with respect to at least one given criterion. The at least one alternative route, meanwhile, is not a least cost route with respect to the given at least one criterion.

Conventional navigation systems are sometimes arranged to propose an alternative faster route when traffic is encountered on a given route that is being navigated. However, such a route would be an alternative route optimised with respect to time under current conditions, i.e. a new fastest route. This differs from the embodiments of the present invention in which the alternative route(s) are not optimal under the current conditions, i.e. fastest routes, but take into account jam probability, such that they may provide a more reliable travel time even in the event that traffic were to increase to some theoretical level.

The jam probability data may be used in various manners in generating the alternative routes, and may be used alone, or more preferably with other attributes of the segments, e.g. jam travel time, non-jam travel time, etc as discussed below. In embodiments the alternative route(s) are generated at least using the jam probability data associated with segments. A jam probability refers to the likelihood of a traffic jam being present on the segment. By taking jam probability into account, the alternative route(s) generated may be such as to minimise the likelihood of jams in the event that traffic were present, e.g. under a theoretical level or levels of traffic. This is based on the theoretical likelihood of a jam, e.g. at a given time of day, rather than the actual presence of a jam under current or recent conditions. This may provide alternative routes that would still be relatively fast under given traffic levels, even if they might not be fast under current conditions, e.g. where no traffic is present, i.e. having greater levels of reliability or robustness under different traffic conditions. This therefore differs from conventional techniques which may determine a new fastest route if traffic is found on an existing route, i.e. in response to actual conditions, but does not consider the possible impact of traffic at the outset when a route is generated.

In embodiments the method comprises exploring routes based on at least the jam probability data (and any other attributes described below, e.g. data representative of jam speed and non-jam speed) associated with the segments; and generating the alternative (navigable) route or routes. Knowledge of jam probability allows routes to be generated in a manner which reduces the likelihood of jams at a future time rather than just considering current traffic conditions. In some embodiments the alternative route(s) may be generated in a manner to minimise jam probability. Thus, the jam probability data may be used as a form of cost function, with a higher jam probability resulting in a higher cost being attributed to the given segment. Use of jam probability in this manner will typically not return a "fastest" route, but one which is less susceptible to the effects of traffic, e.g. one along which travel times may be more predictable and less likely to be influenced by any jam related delay. Such a route may be referred to as a "robust" or "reliable" route. Where multiple alternative routes are provided, these may or may not differ in terms of jam susceptibility. For example, a system may be arranged to show all possible alternative routes having less than a given threshold of jam likelihood, or may be arranged to show a given number of possible alternative routes, which may be user specified. The jam probability data may, however, be used in more complex manners alone, or together with other, e.g. traffic related data.

In accordance with the present invention, the at least one alternative route is generated taking into account data indicative of jam probabilities associated with segments in the area covered by the electronic map. These will be candidate segments for inclusion in the alternative route(s), and may be located in a so-called "routing corridor" between the origin and destination. Any suitable technique may be used, and the generation of the alternative route(s) and the first routes may employ any known routing techniques. For example, various techniques are known which may generate alternative routes, although not by reference to jam probabilities, such as those using Pareto, Plateau and/or Penalty type methods. Methods based on these techniques or combinations thereof may be used. These techniques are particularly relevant to the selection of segments to be considered for alternative routes, allowing those more "sensible" alternative routes to be identified. In embodiments the generation of the first route does not take into account jam probabilities associated with segments in the area covered by the electronic map.

In preferred embodiments, the first route is generated by reference to a first set of segments, and at least one alternative route is generated by reference to a subset of the first set of segments. In embodiments, the first set of segments may be those segments making up an entire road network, or at least the relevant routing corridor in which a route between the origin and destination may lie, and at least one alternative route is generated by reference to a subset i.e. not all of these road segments. In these embodiments, the alternative route(s) are generated by reference to a more limited "alternatives segment network". This may help limit the number of possible alternative routes that may be generated allowing more relevant alternatives to be provided. At least some, and preferably each, of the set of segments considered when generating the alternative route(s) have jam probability data associated with them. The alternatives network may be a network of segments associated with decision points along a predetermined route being followed or the first route. It has been found that rather than seeking alternative routes, which may be a complex network of overlapping and interweaving routes, it may be more efficient to consider decision points, and the possible route options indicated by the outgoing segments of the decision points instead. This may reduce the number of segments to be considered, in particular in the regions between decision points. Routes may then be constructed using appropriate segments.

In embodiments the at least one alternative route is generated by reference to a first route that is a predetermined route being followed, e.g. by reference to decision point(s) along the route. In embodiments the alternative route is generated by reference to a subset of segments selected by reference to the first route, e.g. to a decision point(s) along the route. In some preferred embodiments the method comprises generating the first route between the first route origin and destination, and then generating the, each or an alternative route between the alternative route origin and destination by reference to the first route. This may involve selecting a set of segments to be taken into account when generating the, each or an alternative route by reference to the first route. The alternative route may be generated by reference to a decision point or points along the first route or segments along the first route. Where multiple alternative routes are generated, additional alternative route(s) may be generated by reference to the first route, or to another alternative route. This may provide an iterative type process.

While a jam probability may be useful in selecting routes which will be less susceptible to delay, of course, for different segments, the existence of a jam may be associated with varying levels of delay. On one segment, a jam may have little impact on travel time in practice, while on another, it may have a high impact. It is therefore advantageous to additionally take into account data indicative of at least a jam travel time for each segment. Preferably each segment additionally has jam travel time data associated therewith, the jam travel time data being indicative of the time taken to traverse that segment when it is considered jammed, and the step of generating the alternative route(s) additionally uses the jam travel time data.

Each segment may additionally have a non-jam travel time data associated therewith, the non-jam travel time data being indicative of the time taken to traverse that segment when it is not considered jammed, and the step of generating the alternative route(s) additionally uses the non-jam travel time data. In preferred embodiments both jam travel time data and non-jam travel time data are used with the jam probability data in generating the alternative route(s). However, only one of these types of data may be associated with the segments, preferably then being the jam travel time data.

The jam or non-jam travel time data may be directly or indirectly indicative of travel time over the segment under jam or non-jam conditions. For example, it may be in terms of a jam or non-jam travel speed, which, with a segment length, may be used to derive a travel time.

Preferably the jam or non-jam travel time data is based on an average jam speed or average non-jam speed for the segment. The jam speed or non-jam speed may be determined as desired by reference, e.g. to a suitable threshold speed indicative of jam conditions. The speeds are preferably based on historical data. Further features regarding the derivation of jam or non-jam travel times are described below.

Preferably the jam probability, and, where provided, jam travel time data and/or non-jam travel time data, are time dependent. In these preferred embodiments, the jam probability and, where provided, jam or non-jam travel time data are indicative of the probability of a jam or the time of travel along the segment when jammed or not jammed in a given time period. In some preferred embodiments each segment is associated with data indicative of a plurality of jam probabilities and, in embodiments a plurality of jam travel times and/or a plurality of non-jam travel times, each one of the plurality of jam probabilities and, where provided, plurality of jam travel times and/or non-jam travel times being in respect of a different given time period. In these preferred embodiments the jam probability, jam travel time and/or non-jam travel time data of a segment used in the generation of the alternative route(s) is that in respect of the appropriate time, e.g. the time at which the route is to be travelled. This may be a current time or future time, depending upon the stage at which the alternative route(s) are generated. It may be for example that jam probabilities, and corresponding jam or non-jam travel times for segments as appropriate, are calculated according to the time of the year, the day of the week and/or the time of day. In some embodiments jam probabilities are provided at time intervals between 1 minute and 2 hours, between 5 minutes and 1 hour, between 10 minutes and 30 minutes or at time intervals of 15 minutes. In embodiments, the alternative route(s) generated are therefore alternative route(s) for the appropriate time.

References to "segment data" herein refer to the jam probability data and any other, e.g. jam or non-jam travel time data, associated therewith.

In preferred embodiments the step of generating the alternative route(s) comprises using the jam probability data, and preferably jam and/or non-jam travel time data, to explore routes (and then generate alternative routes) based on an expected reliability of the route under a set of theoretical traffic conditions (the "traffic reliability"). Of course, this step could be carried out for more than one set of theoretical traffic conditions. Thus, the step of generating the alternative route(s) is preferably based on an expected reliability of the route under one or more sets of theoretical travel conditions. The set(s) of traffic conditions are predefined, and may be based on a traffic level or levels assigned to different segments in the area. Such levels may be according to a quantitative scale. In a simple situation a set of theoretical traffic conditions used in generating the alternative route(s) could be simply a "traffic state" rather than "non-traffic state". Different sets of traffic conditions could be used for different alternative routes. The term "theoretical" traffic conditions reflects that the conditions are not actual or real time traffic conditions, rather a set of conditions used for the purpose of deriving the alternative routes, which might be, for example, an expected set of conditions, a set of conditions based on historical conditions for the relevant time, etc.

It will be appreciated that the theoretical traffic condition used in determining route or segment reliability herein is preferably a non-zero traffic condition, i.e. indicative of the presence of traffic.

The expected reliability of the route is preferably based on an expected travel time for traversing the route under the set of theoretical traffic conditions. The alternative route(s) may be selected by reference to the expected reliability, e.g. those route(s) that are found to be relatively fast between the alternative route origin and destination under the given set of theoretical traffic conditions. The alternative route(s) may include: a most reliable or fastest route, routes more reliable than or faster than a given threshold, etc. If multiple sets of traffic conditions are considered, then, if desired, routes may be chosen as representing those routes with a reasonable, although not necessarily an optimal, reliability under respective differing sets of conditions. In some embodiments at least a first alternative route may be generated that is the most reliable, e.g. fastest route, under a first given theoretical set of traffic conditions. A further alternative route may then be generated that is the second most reliable, e.g. fastest route under the first set of traffic conditions, or that has a reliability, e.g. travel time, relative to a given threshold, or, in other embodiments, that is the most reliable, e.g. fastest route, under a second different given set of theoretical traffic conditions, etc. Other arrangements are possible. For example, the selection of which alternative routes are generated and provided to a user may additionally be governed by further predefined factors or user preferences, etc.

The step of exploring routes based on an expected reliability of the routes under one or more sets of theoretical traffic conditions, and/or, in general, the step of generating the alternative route(s) of the present invention, preferably comprises obtaining for each of a plurality of segments in the area, at least one measure indicative of the reliability of the segment under a given theoretical traffic condition, the measure being obtained using at least the jam probability data (and preferably jam and/or non-jam travel time data) associated with the segment, and exploring the routes using the reliability measures of the segments. Preferably the reliability measure of a segment is a function of the jam probability, jam travel time and non-jam travel time data of the segment. The reliability measure of a segment is preferably based on an expected travel time for traversing the segment under the theoretical traffic condition. The reliability measure is indicative of an expected reliability of the segment.

In some embodiments the reliability measure $t_\rho$ of a segment is given by:

$$t_\rho := \left(1 - \rho^{\frac{p_j}{\overline{p}_j}}\right) \cdot t_n + \rho^{\frac{p_j}{\overline{p}_j}} \cdot t_j$$

wherein: $\overline{p}_j$ denotes average jam probability for segments in the area $p_j$ denotes jam probability for the segment $\rho$ is a parameter indicative of traffic condition $t_n$ is non-jam travel time for the segment, and $t_j$ is jam travel time for the segment.

It is believed that the use of a reliability measure of this type is new and advantageous in its own right. Accordingly, from a further aspect of the invention there is provided a method of generating a route in an area covered by an electronic map, the map comprising a plurality of segments representing navigable segments in the area covered by the electronic map, at least some, and preferably each, segment being associated with: jam probability data representative of a likelihood of a jam on the segment; jam travel time data representative of the time to traverse that segment when it is considered jammed; and non-jam travel time data representative of the time to traverse that segment when it is not considered jammed, the method comprising, for each of a plurality of segments, using the jam probability data, the jam travel time data and the non-jam travel time data associated with the segment to obtain a measure indicative of an expected reliability of the segment under a theoretical traffic condition, and using the expected reliability measure in generating a route between an origin and a destination in the area.

The reliability measure is preferably based on a time to traverse the segment under the given traffic condition.

In accordance with a further aspect of the invention, the present invention provides a system of generating a route in an area covered by an electronic map, the map comprising a plurality of segments representing navigable segments in the area covered by the electronic map, at least some, and preferably each, segment being associated with: jam probability data representative of a likelihood of a jam on the segment; jam travel time data representative of the time to traverse that segment when it is considered jammed; and non-jam travel time data representative of the time to traverse that segment when it is not considered jammed, the system comprising:

means for, for each of a plurality of segments, using the jam probability data, the jam travel time data and the non-jam travel time data associated with the segment to obtain a measure indicative of an expected reliability of the segment under a theoretical traffic condition; and means for using the expected reliability measure in generating a route between an origin and a destination in the area.

The method in these preferred embodiments may incorporate any or all of the features described in relation to the other aspects of the invention, other than that it is not limited to the route generated being an alternative route. In these embodiments the traffic condition is preferably user specified, e.g. via a navigation device. These aspects are particularly applicable to the generation of a route before navigation commences. The reliability measure may be based on a user specified traffic condition to obtain a route that is resistant to traffic to a user specified degree.

In accordance with the invention in any of its aspects or embodiments, in some preferred embodiments the reliability measure takes into account the jam probability of a segment relative to that of other segments in the area, e.g. an average jam probability of the segments. In these preferred embodiments, the average jam probability may be determined in any suitable manner using jam probabilities of other, e.g. all, segments in the area. The average jam probability may be in respect of a given time period being that in respect of which the reliability measure is being determined, or may be in respect of all time periods. In preferred embodiments the reliability measure is therefore a function additionally of a jam probability of segment relative to other segments in the area. The average jam probability of all segments may be set the same for all segments.

It will be appreciated that a plurality of reliability measures may be obtained for each segment based on different given theoretical traffic conditions. In these situations, the reliability measures used in determining the alternative routes based upon their reliability under a given set of traffic conditions may be different for different segments, or may be the same. For example, when generating a route that is reliable under a given set of traffic conditions, that set of traffic conditions may be represented using reliability measures for different segments determined with respect to the same or differing theoretical traffic conditions. Thus, the overall set of traffic conditions used in determining the alternative route(s) may reflect differing conditions on individual segments. Such a scenario may be used, as explained below, to drive an alternative route away from the first or other existing route, e.g. by using traffic reliability measures based on a higher level of traffic for segments on that route, and measures based on a lower level of traffic for segments away from the route.

The method extends to associating a set of one or more reliability measures with each segment, the reliability measure(s) being obtained in any of the manners described herein, and may comprise storing a set of one or more reliability measures in association with each segment. Thus, the reliability measure may be a predetermined measure associated with segments, in a similar manner to jam probability and other attributes, or may be determined as required, or "on the fly".

The measures of reliability of segments may be used in any suitable manner in the generation of routes. In preferred embodiments, the measure(s) indicative of the reliability of the segment are used in a cost function for determining the alternative route(s) (or route in the further aspects of the invention). The cost function may, in simple cases, be based solely upon the reliability measure, but in other cases, as known in the art, the reliability measure may form part of a complex cost function made up of contributions from various parameters to be balanced.

The reliability of a segment is assessed by reference to a given traffic condition. The traffic condition is a predefined traffic condition. The condition is a theoretical condition, rather than an actual or real time condition, and may be based upon historic data, or simply be a relative indication of traffic severity. The condition may simply be a traffic or non-traffic state, but preferably is indicative of a traffic level, i.e. a level of severity of traffic. A traffic condition, e.g. level, may be specified by means of a traffic condition parameter, which may be indicative in any manner of a traffic condition, e.g. level. The traffic condition parameter may be indicative of a relative traffic level, and may be normalised. The traffic condition may be a qualitative indication of traffic severity. For example, traffic level may be expressed on a suitable scale, e.g. from 0 to 1, etc. In some embodiments the traffic condition is user specified. Thus a user may select a value for the traffic condition parameter indicative of a desired traffic condition, e.g. level, for use in the determination of the alternative route(s). By way of example, a parameter indicative of relatively high levels of traffic may be chosen to result in the system generating an alternative route with relatively little susceptibility to delay under severe traffic conditions. These embodiments are particularly effective in the context of the further aspects of the invention, which are not directed specifically to the generation of alternative routes. In other arrangements, particularly embodiments using alternative routes, the traffic condition parameter may be set automatically. In some embodiments, alternative route(s) are generated iteratively by successively increasing the traffic condition parameter.

The traffic condition may be set as desired for segments when generating routes, alternative or otherwise. In aspects generating routes which are not necessarily alternative, the reliability measure may be determined on the basis of a user specified traffic condition for use in route generation in accordance with user preferences. For example, a user may specify a severe traffic condition in order to obtain a highly traffic resistant route.

In aspects and embodiments using alternative routes, it is envisaged that the traffic condition may be set at different levels for different segments to "push" alternate routes generated away from the first route or otherwise tailor the routes as desired. Traffic levels may be increased in different iterations of an iterative process to find alternative routes. For example, a traffic level may be set to zero to obtain the first route, being a route which is intended to be a fastest route without taking into account traffic conditions. This route may be used as a starting point, this time assigning segments forming part of the route a high traffic level, and obtaining an alternative route on the basis of the reliability of those segments at the higher level. Other segments not on the route may be assigned a lower traffic level. In this way, a new alternative route will tend to be generated that contains different segments to those of the first route unless they are of high reliability under the given traffic level. This process may be repeated iteratively with the traffic level parameter being increased to generate most reliable routes.

In the above preferred embodiments in which alternative route(s) are determined based on a reliability of segments under given traffic conditions using the jam probabilities, and preferably jam and/or non-jam travel time, the reliability is preferably in respect of a given time period, being based upon jam probability, and jam and/or non-jam travel time for that period. Thus, the reliability measure obtained, and the reliable routes generated are preferably for the appropriate time, i.e. a current time, or other desired time, e.g. time of expected travel, etc, being based upon data relating to a time period containing the appropriate time. In embodiments each segment may be associated with a set of reliability measures, each measure being in respect of a different given time period. If an average jam probability of segments is used, this may also be in respect of the given time period.

The jam probability data, jam travel time and/or non-jam travel time data as appropriate are preferably based on historic data. In this context the word "historic" should be considered to indicate data that is not live, that is data that is not directly reflective of conditions on the segment at the present time or in the recent past (perhaps within roughly the last five, ten, fifteen or thirty minutes). Historic jam probabilities and historic jam travel time may for example relate to events occurring days, weeks or even years in the past. While such data may not therefore be a result of monitoring present road conditions, it may still be relevant for calculation of jam probability for the segment. Use of historic data, rather than live data alone, may increase the quantity of relevant data available and may therefore allow a more accurate jam probability for the segment to be calculated. This may especially be the case where there is little or no live travel data available.

Some further details regarding the jam probabilities, jam speed and non jam travel times, in particular the manner in which these may be generated, will now be described.

It will be appreciated that the present invention extends to a step of generating the jam probability data, and associating the data with the segments, and, where appropriate jam or non-jam travel time data. This may be carried out in any of the manners described below. In embodiments in which route generation is performed by a navigation device, the step of generating the jam probability and other jam or non jam travel time data may be performed by a server, although other arrangements are possible.

The determination of jam probabilities, jam travel time and non-jam travel time for segments is described in more detail in the Applicant's co-pending application PCT/EP2012/051801 filed 2 Feb. 2012, entitled "Generating Segment Data"; the entire contents of which is incorporated herein by reference. While this document and some of the discussion below refers to jam or non-jam "speeds" for segments, it will be understood how a corresponding jam or non-jam travel time may readily be obtained using the speed, by consideration of segment length.

The non-jam travel time and/or the jam travel time for a segment may be, or be based upon, an average speed of travel across the segment. The average speed of travel across a segment can be based on historic data. For example, a historic average speed may be recorded directly, or may be calculated from a recorded historic travel time across the segment. This system may allow timely interventions in routing based on jam probabilities specific to a segment. The decreased expected average speed of travel across the segment where there is a jam may be factored in when a route is generated. Because, in these embodiments, the method is based on jam probabilities taking account of historic data, jams may be usefully predicted even where there is little or no live data for the segment in question. In other arrangements the jam probability, jam speed or non jam speed may be based at least in part upon live travel time data for segments. Combinations of live and historic data may be used, or these types of data may be used alone. Live data may be thought of as data which is relatively current and provides an indication of what is occurring on the segment. The live data may typically relate to the conditions on the segment within the last 30 minutes. In some embodiments the live data may relate to conditions on the segment within the last 15 minutes, 10 minutes or 5 minutes.

There are many ways in which historic travel times across the segment may be collected or generated for use in determining jam or non-jam travel time, e.g. time interval between a satellite navigation trace entering and exiting a segment, or time interval between two number plate recognition or Bluetooth signal events, or recordal of time of departure and time of arrival, or even simulation according to traffic flow data. Preferably the historical travel times are based on positional data relating to the movement of devices having positional capability with respect to time along the segments, and which may be used to provide a positional "trace" of the path taken by the device. The devices may be any mobile devices that are capable of providing the positional data and sufficient associated timing data. The device may be any device having position determining capability. Typically the device may comprise a GPS or GSM device. Such devices may include navigation devices, mobile telecommunications devices with positioning capability, position sensors etc. The device may be associated with a vehicle. In these embodiments the position of the device will correspond to the position of the vehicle. Of course, the positional data may be obtained from a combination of different devices, or a single type of device e.g. devices associated with vehicles.

It will be appreciated that the positional data obtained from the plurality of devices, may be referred to as "probe data". The data obtained from devices associated with vehicles or pedestrians respectively may be referred to as vehicle or pedestrian probe data. References to probe data herein should therefore be understood as being interchangeable with the term "positional data", and the positional data may be referred to as probe data for brevity herein.

In this method a plurality of time-stamped position data is preferably captured/uploaded from a plurality of devices having positioning capability e.g. navigation devices, such as portable navigations devices (PNDs). Techniques of analysing such data, e.g. to obtain average speed data are known, for example as described in WO 2009/053411 A1. Thus, in an embodiment, a plurality of time-stamped position data is preferably obtained, e.g. captured/uploaded, from a plurality of devices, e.g. navigation devices having positioning capability. This data is preferably divided into a plurality of traces, with each trace representing data received from a device over a predetermined time period. An average may then be taken of the recorded speeds within each predetermined time period for each navigable segment.

It will be appreciated that the phrase "average speed" is used herein. It will be appreciated however that in reality it may never be possible to know an average speed completely accurately. In some cases for example, average speeds calculated can only be as accurate as the equipment used to measure time and position. It will be appreciated therefore that wherever the phrase "average speed" is used, it should be interpreted as the average speed as calculated based on measurements which may themselves have associated errors.

In some embodiments the jam travel time is based on an average jam speed being the average of all, or substantially all or a selection of, average speeds of travel across that segment, when that segment is considered jammed. In other embodiments however the mode or a percentile of all or substantially all or a selection of historic average speeds of travel across that segment, when that segment is considered jammed may be used.

Each segment may also have a jam threshold speed associated therewith, the jam threshold speed indicating an average speed of travel across that segment below which the segment is considered jammed. In other words, the jam threshold speed is selected such that an average speed of travel across the segment below the jam threshold speed can be classified as jammed, whereas an average speed of travel across the segment above the jam threshold speed can be considered not jammed.

In some embodiments the jam threshold speed is defined according to a selected percentage of the free-flow speed for the segment. In alternative embodiments however the jam threshold speed may be alternatively defined, e.g. a pre-defined value corresponding to the road type or a particular speed simply considered to be indicative of jammed traffic.

The free-flow speed for a road segment is preferably defined as the average speed of travel across the segment during a period of time in which there is no or substantially little traffic. This period may for example be one or more night-time hours where speed over the segment may be less influenced by other users. Such measurements of free-flow speeds will still reflect the influence of speed limits, road layout and traffic management infrastructure for example. This may therefore be a more accurate reflection of the true free-flow speed than posted speed limits, legal speeds or speed assignments based on road category. In other embodiments however the free-flow speed may be calculated or selected differently (it may for example simply be taken to be the speed limit for the segment).

In some embodiments the selected percentage of the free-flow speed is between 30% and 70%, more preferably is between 40% and 60%, and most preferably is substantially 50%.

In some embodiments a pre-defined upper limit may be used as the jam threshold speed where the method of defining the jam threshold speed would otherwise result in the use of a higher speed. It may be for example that the method of defining the jam threshold speed might in a particular case result in a speed considered too high to be jammed for the particular segment. In that case the jam threshold speed may default to the upper limit.

The jam probability for a particular segment can be generated according to historic travel data for the segment and a jam condition for the segment, wherein the jam condition indicates whether the segment is jammed or not.

In some embodiments the jam probability for a segment is generated by a method comprising the steps of collecting historic travel data for the segment: defining a jam condition for the segment, such that when the jam condition is satisfied the segment is classified as jammed and otherwise as not jammed; generating a jam probability for the segment according to the historic travel data and the jam condition definition; and associating the jam probability with the segment in the electronic map.

As will be appreciated a jam probability is likely to vary depending on the time of day, the day of the week and even the time of year. Consequently the provision of multiple time dependent jam probabilities is likely to give more accurate jam condition prediction than a single jam probability for a segment. While embodiments taking into account a time dependence of jam probabilities will be discussed below, it may be seen that any of these embodiments could equally be applied to providing time dependent jam or non-jam travel time for segments, and references to jam probabilities, unless the context demands otherwise below, could be interchanged for jam or non-jam travel time as appropriate.

In some embodiments one or more alternative jam probabilities are provided for use with a segment within corresponding time periods allowing selection of the most appropriate jam probability at any given time based on one or more factors other than time dependent variation. Selection of an alternative jam probability for use may be appropriate in particular situations, for example in different weather conditions, or where a particular event such as a football game is occurring. Such situations may be considered factors other than time dependent variation. Such situations may be considered atypical. As will be appreciated the provision of such alternative jam probabilities may be dependent on the availability of sufficient historic data to create an accurate jam probability.

In some embodiments alternative sets of time dependent jam probabilities are provided allowing selection of the most appropriate jam probability based both on the time and on other factors. It may be for example that one set of time dependent jam probabilities is used if the weather is dry and another set if there is rain.

In some embodiments the jam probability for a segment is calculated according to the ratio of the number of calculated average speeds of travel across the segment above and below the jam threshold speed. By way of example, a collection of GPS probes giving historic travel times across the segment might be analysed. In this case the number of probes requiring an average speed across the segment above and below the jam threshold speed might be compared. In one example, the ratio of jammed and not jammed probes might be 70:30, giving a jam probability of 30%.

In some embodiments the jam probability for the segment is calculated according to the time periods for which the segment is jammed and not jammed, e.g. the period for which the historic average speeds of travel indicate that the jam condition is satisfied.

In some embodiments, where segments are concatenated, the average percentage of segments jammed may be used to calculate the jam probability for one, some or all of the concatenated segments. In embodiments, where multiple time dependent jam probabilities are associated with a segment, the historic travel data is grouped according to time of recordal. For example the historic travel data may be grouped together if they have been received within a predetermined time period. The predetermined time period may be, for example, 5 minutes, 10 minutes, 15 minutes, 20 minutes, 30 minutes or 1 hour. In this way a generated jam probability may be time related and may therefore be accurate when used in the prediction of jams at a corresponding time. It may be for example that the historic segment data and so the jam probability for a segment relate to the period between 8.30 am and 8.45 am on Monday mornings during the months of December to February. Therefore when this jam probability is used on Monday mornings in the corresponding months at the corresponding time it may be a better predictor of jams than a non-time dependent jam probability.

In some embodiments jam probabilities are calculated according to or are at least influenced by the time of the year. This may serve to increase jam probability accuracy as jam probability may vary depending on seasonal influences such as prevailing weather and road surface condition.

In some embodiments jam probabilities are calculated according to or are at least influenced by the day of the week. This may serve to increase jam probability accuracy as jam probability may vary depending on day of the week dependent factors such as weekend shopping, Friday travel for a weekend away, haulage schedules and Monday long-distance commuting.

In some embodiments jam probabilities are calculated according to or are at least influenced by the time of day. This may serve to increase jam probability accuracy as jam probability may vary depending on time of the day dependent factors such as rush hours, school runs, opening and closing times (e.g. bars, restaurants, theatres, concert venues, cinemas, clubs, etc) start and finish times (e.g. festivals, shows and sporting events etc), arrival and departure times (e.g. trains, ships and aircraft) and widespread commonality of activity (e.g. eating or sleeping). In some embodiments there may for example be a single jam probability for night. Night may be a predefined period between set times, e.g. between substantially 11 pm and 6 am.

In some embodiments jam probabilities are calculated for substantially fifteen minute time intervals. However time intervals above or below this may be used, e.g. 5 minutes, 10 minutes, 15 minutes, 20 minutes, 30 minutes, 1 hour or longer periods such as the night. Further calculated jam probabilities that are adjacent in time may be concatenated. This may be particularly useful where the jam probabilities are similar (e.g. potentially night time hours).

In some embodiments jam probabilities are calculated according to or are at least influenced by the occurrence of a particular event or situation. Such events or situations may for example include particular types of weather, events such as football matches or exhibitions and public holidays and the like.

In some of the embodiments, the jam probabilities are calculated or at least influenced by more than one of the factors discussed above.

As discussed above, when a jam condition is predicted to exist, the expected average speed of travel across the segment may be the jam speed for the relevant segment or a speed based thereon (and for example at the appropriate time). For example the jam speed for a segment could be modified in accordance with one or more dynamic parameters, such as weather. However, the jam speed need not be an average speed under jam conditions. The jam speed may be any speed derived from a distribution of speeds for the relevant segment under jam conditions, e.g. a given percentile travel time, a maximum of travel time, etc.

Similarly, and again as discussed above, when a jam condition is not predicted, the expected average speed of travel across the segment (and hence the expected travel time) may be an average speed for the relevant segment (and for example at the appropriate time) or a speed based thereon. For example the non jam speed can be the average of all, or substantially all or a selection of historic average speeds of travel across that segment. In other embodiments however the mode or a percentile of all or substantially all or a selection of historic average speeds of travel across that segment may be used. Alternatively a speed may be selected in another way.

Although for brevity, reference is made to "jam probability", "non-jam speed" or "jam speed" herein, it will be understood that such references are to data indicative of these attributes if not explicitly stated. Thus any reference to e.g. jam probability or another such attribute, may be replaced by a reference to data indicative thereof, i.e. jam probability data, etc. The data may be in any manner indicative of the relevant property, and may be the property, or otherwise be based thereon.

Any of the methods in accordance with the present invention may be implemented at least partially using software e.g. computer programs. The present invention thus also extends to a computer program comprising computer readable instructions executable to perform, or to cause a navigation device and/or server to perform, a method according to any of the aspects or embodiments of the invention.

The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

Regardless of its implementation, a navigation apparatus used in accordance with the present invention may comprise a processor, memory, and digital map data stored within said memory. The processor and memory cooperate to provide an execution environment in which a software operating system may be established. One or more additional software programs may be provided to enable the functionality of the apparatus to be controlled, and to provide various other functions. A navigation apparatus of the invention may preferably include GPS (Global Positioning System) signal reception and processing functionality. The apparatus may comprise one or more output interfaces by means of which information may be relayed to the user. The output interface(s) may include a speaker for audible output in addition to the visual display. The apparatus may comprise input interfaces including one or more physical buttons to control on/off operation or other features of the apparatus.

In other embodiments, the navigation apparatus may be implemented at least in part by means of an application of a processing device which does not form part of a specific navigation device. For example the invention may be implemented using a suitable computer system arranged to execute navigation software. The system may be a mobile or portable computer system, e.g. a mobile telephone or laptop, or may be a desktop system.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

Advantages of these embodiments are set out hereafter, and further details and features of each of these embodiments are defined in the accompanying dependent claims and elsewhere in the following detailed description.

BRIEF DESCRIPTION OF THE DRAWINGS

Embodiments of the invention will now be described, by way of example only, with reference to the accompanying Figures, in which.

DETAILED DESCRIPTION OF THE FIGURES

Embodiments of the present invention will now be described with particular reference to a Portable Navigation Device (PND). It should be remembered, however, that the teachings of the present invention are not limited to PNDs but are instead universally applicable to any type of processing device that is configured to execute navigation software in a portable manner so as to provide route planning and navigation functionality. It follows therefore that in the context of the present application, a navigation device is intended to include (without limitation) any type of route planning and navigation device, irrespective of whether that device is embodied as a PND, a vehicle such as an automobile, or indeed a portable computing resource, for example a portable personal computer (PC), a mobile telephone or a Personal Digital Assistant (PDA) executing route planning and navigation software.

Further, embodiments of the present invention are described with reference to road segments. It should be realised that the invention may also be applicable to other navigable segments, such as segments of a path, river, canal, cycle path, tow path, railway line, or the like. For ease of reference these are commonly referred to as a road segment.

It will also be apparent from the following that the teachings of the present invention even have utility in circumstances, where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
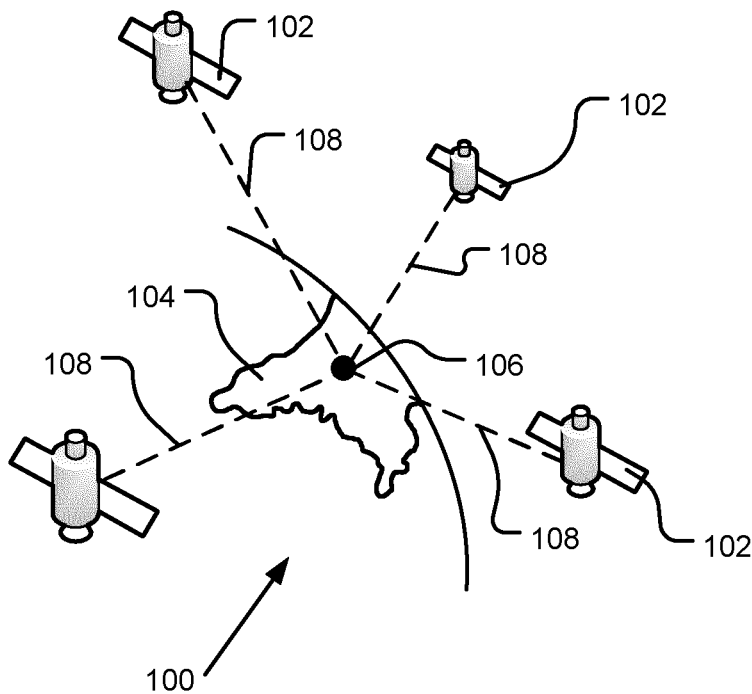
FIG. 1 is a schematic illustration of an exemplary part of a Global Positioning System (GPS) usable by a navigation device.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location, as GPS data, to any number of receiving units. However, it will be understood that Global Positioning systems could be used, such as GLOSNASS, the European Galileo positioning system, COMPASS positioning system or IRNSS (Indian Regional Navigational Satellite System).

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives GPS data as spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
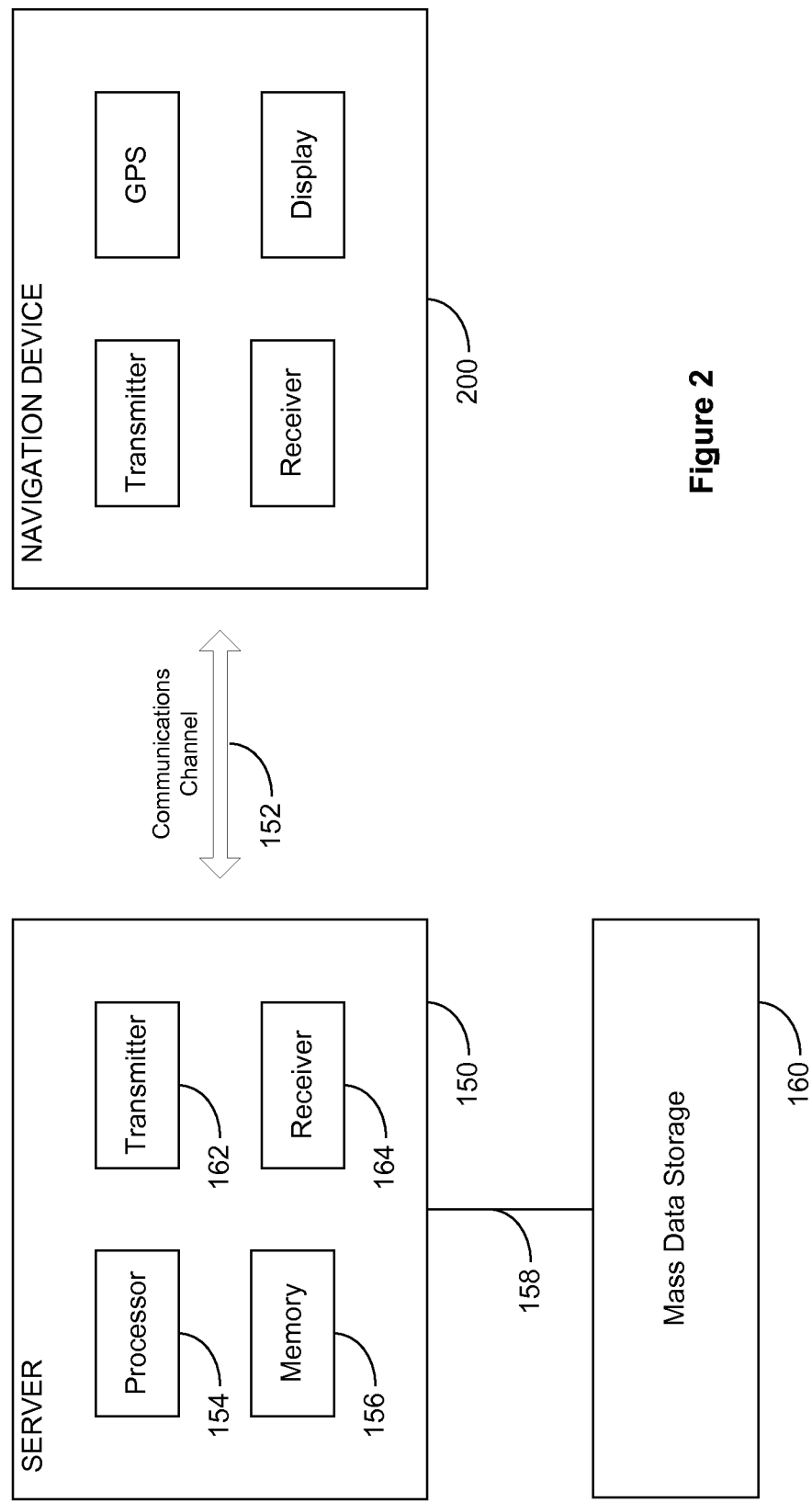
FIG. 2 is a schematic diagram of a communications system for communication between a navigation device and a server.

Turning to FIG. 2, a navigation device 200 (i.e. a PND) comprising or coupled to the GPS receiver device 106, is capable of establishing a data session, if required, with network hardware of a "mobile" or telecommunications network via a mobile device (not shown), for example a mobile telephone, PDA, and/or any device with mobile telephone technology, in order to establish a digital connection, for example a digital connection via known Bluetooth technology. Thereafter, through its network service provider, the mobile device can establish a network connection (through the Internet for example) with a server 150. As such, a "mobile" network connection can be established between the navigation device 200 (which can be, and often times is, mobile as it travels alone and/or in a vehicle) and the server 150 to provide a "real-time" or at least very "up to date" gateway for information.

The establishing of the network connection between the mobile device (via a service provider) and another device such as the server 150, using the Internet for example, can be done in a known manner. In this respect, any number of appropriate data communications protocols can be employed, for example the TCP/IP layered protocol. Furthermore, the mobile device can utilize any number of communication standards such as CDMA2000, GSM, IEEE 802.11 a/b/c/g/n, etc.

Hence, it can be seen that the Internet connection may be utilised, which can be achieved via data connection, via a mobile phone or mobile phone technology within the navigation device 200 for example.

Although not shown, the navigation device 200 may, of course, include its own mobile telephone technology within the navigation device 200 itself (including an antenna for example, or optionally using the internal antenna of the navigation device 200). The mobile phone technology within the navigation device 200 can include internal components, and/or can include an insertable card (e.g. Subscriber Identity Module (SIM) card), complete with necessary mobile phone technology and/or an antenna for example. As such, mobile phone technology within the navigation device 200 can similarly establish a network connection between the navigation device 200 and the server 150, via the Internet for example, in a manner similar to that of any mobile device.

For telephone settings, a Bluetooth enabled navigation device may be used to work correctly with the ever changing spectrum of mobile phone models, manufacturers, etc., model/manufacturer specific settings may be stored on the navigation device 200 for example. The data stored for this information can be updated.

In FIG. 2, the navigation device 200 is depicted as being in communication with the server 150 via a generic communications channel 152 that can be implemented by any of a number of different arrangements. The communication channel 152 generically represents the propagating medium or path that connects the navigation device 200 and the server 150. The server 150 and the navigation device 200 can communicate when a connection via the communications channel 152 is established between the server 150 and the navigation device 200 (noting that such a connection can be a data connection via mobile device, a direct connection via personal computer via the Internet, etc.).

The communication channel 152 is not limited to a particular communication technology. Additionally, the communication channel 152 is not limited to a single communication technology; that is, the channel 152 may include several communication links that use a variety of technology. For example, the communication channel 152 can be adapted to provide a path for electrical, optical, and/or electromagnetic communications, etc. As such, the communication channel 152 includes, but is not limited to, one or a combination of the following: electric circuits, electrical conductors such as wires and coaxial cables, fibre optic cables, converters, radio-frequency (RF) waves, the atmosphere, free space, etc. Furthermore, the communication channel 152 can include intermediate devices such as routers, repeaters, buffers, transmitters, and receivers, for example.

In one illustrative arrangement, the communication channel 152 includes telephone and computer networks. Furthermore, the communication channel 152 may be capable of accommodating wireless communication, for example, infrared communications, radio frequency communications, such as microwave frequency communications, etc. Additionally, the communication channel 152 can accommodate satellite communication.

The communication signals transmitted through the communication channel 152 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), General Packet Radio Service (GPRS), etc. Both digital and analogue signals can be transmitted through the communication channel 152. These signals may be modulated, encrypted and/or compressed signals as may be desirable for the communication technology.

The server 150 includes, in addition to other components which may not be illustrated, a processor 154 operatively connected to a memory 156 and further operatively connected, via a wired or wireless connection 158, to a mass data storage device 160. The mass storage device 160 contains a store of navigation data and map information, and can again be a separate device from the server 150 or can be incorporated into the server 150. The processor 154 is further operatively connected to transmitter 162 and receiver 164, to transmit and receive information to and from navigation device 200 via communications channel 152. The signals sent and received may include data, communication, and/or other propagated signals. The transmitter 162 and receiver 164 may be selected or designed according to the communications requirement and communication technology used in the communication design for the navigation system 200. Further, it should be noted that the functions of transmitter 162 and receiver 164 may be combined into a single transceiver.

As mentioned above, the navigation device 200 can be arranged to communicate with the server 150 through communications channel 152, using transmitter 166 and receiver 168 to send and receive signals and/or data through the communications channel 152, noting that these devices can further be used to communicate with devices other than server 150. Further, the transmitter 166 and receiver 168 are selected or designed according to communication requirements and communication technology used in the communication design for the navigation device 200 and the functions of the transmitter 166 and receiver 168 may be combined into a single transceiver as described above in relation to FIG. 2. Of course, the navigation device 200 comprises other hardware and/or functional parts, which will be described later herein in further detail.

Software stored in server memory 156 provides instructions for the processor 154 and allows the server 150 to provide services to the navigation device 200. One service provided by the server 150 involves processing requests from the navigation device 200 and transmitting navigation data from the mass data storage 160 to the navigation device 200. Another service that can be provided by the server 150 includes processing the navigation data using various algorithms for a desired application and sending the results of these calculations to the navigation device 200.

The server 150 constitutes a remote source of data accessible by the navigation device 200 via a wireless channel. The server 150 may include a network server located on a local area network (LAN), wide area network (WAN), virtual private network (VPN), etc.

The server 150 may include a personal computer such as a desktop or laptop computer, and the communication channel 152 may be a cable connected between the personal computer and the navigation device 200. Alternatively, a personal computer may be connected between the navigation device 200 and the server 150 to establish an Internet connection between the server 150 and the navigation device 200.

The navigation device 200 may be provided with information from the server 150 via information downloads which may be updated automatically, from time to time, or upon a user connecting the navigation device 200 to the server 150 and/or may be more dynamic upon a more constant or frequent connection being made between the server 150 and navigation device 200 via a wireless mobile connection device and TCP/IP connection for example. For many dynamic calculations, the processor 154 in the server 150 may be used to handle the bulk of processing needs, however, a processor (not shown in FIG. 2) of the navigation device 200 can also handle much processing and calculation, oftentimes independent of a connection to a server 150.

Figure 3:
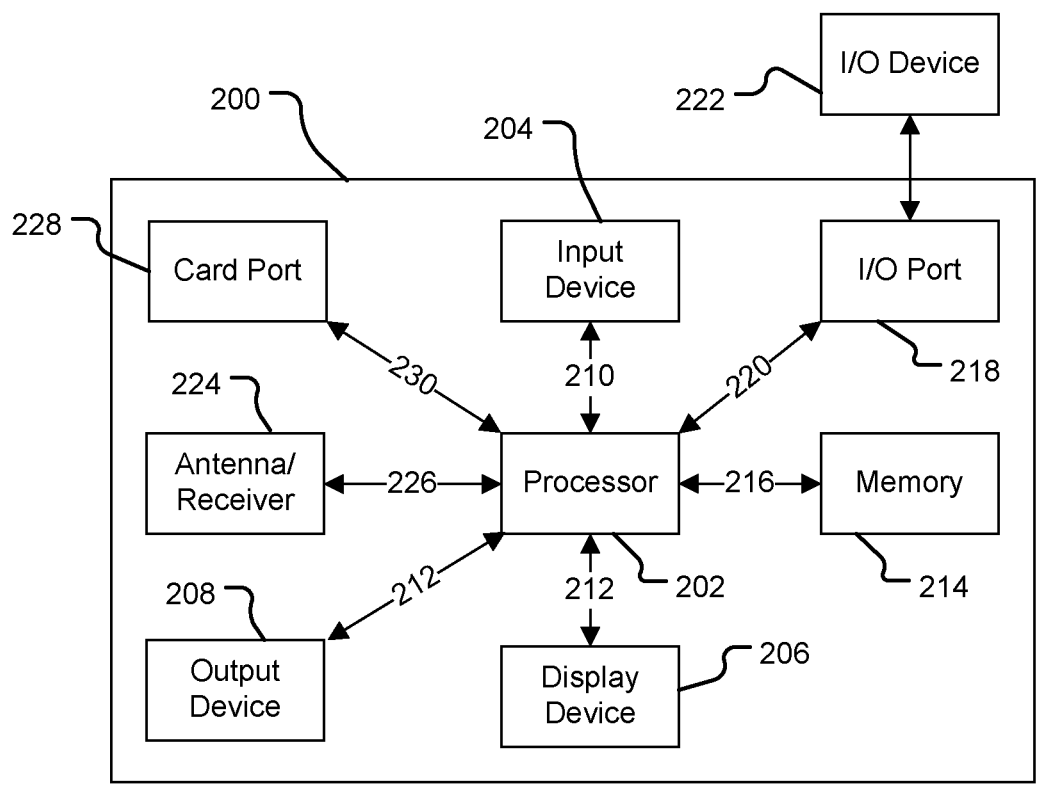
FIG. 3 is a schematic illustration of electronic components of the navigation device of FIG. 2 or any other suitable navigation device.

Referring to FIG. 3, it should be noted that the block diagram of the navigation device 200 is not inclusive of all components of the navigation device, but is only representative of many example components. The navigation device 200 is located within a housing (not shown). The navigation device 200 includes processing circuitry comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, one aspect of the input device 204, the touch panel, and the display screen 206 are integrated so as to provide an integrated input and display device, including a touchpad or touchscreen input 250 (FIG. 4) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214 via connection 216 and is further adapted to receive/send information from/to input/output (I/O) ports 218 via connection 220, wherein the I/O port 218 is connectible to an I/O device 222 external to the navigation device 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the Internet or any other network for example, and/or to establish a connection to a server via the Internet or some other network for example.

The memory 214 of the navigation device 200 comprises a portion of non-volatile memory (for example to store program code) and a portion of volatile memory (for example to store data as the program code is executed). The navigation device also comprises a port 228, which communicates with the processor 202 via connection 230, to allow a removable memory card (commonly referred to as a card) to be added to the device 200. In the embodiment being described the port is arranged to allow an SD (Secure Digital) card to be added. In other embodiments, the port may allow other formats of memory to be connected (such as Compact Flash (CF) cards, Memory Sticks, xD memory cards, USB (Universal Serial Bus) Flash drives, MMC (MultiMedia) cards, SmartMedia cards, Microdrives, or the like). FIG. 3 further illustrates an operative connection between the processor 202 and an antenna/receiver 224 via connection 226, wherein the antenna/receiver 224 can be a GPS antenna/receiver for example and as such would function as the GPS receiver 106 of FIG. 1. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 3 are powered by one or more power sources (not shown) in a conventional manner. Such power sources may include an internal battery and/or a input for a low voltage DC supply or any other suitable arrangement. As will be understood by one of ordinary skill in the art, different configurations of the components shown in FIG. 3 are contemplated. For example, the components shown in FIG. 3 may be in communication with one another via wired and/or wireless connections and the like. Thus, the navigation device 200 described herein can be a portable or handheld navigation device 200.

In addition, the portable or handheld navigation device 200 of FIG. 3 can be connected or "docked" in a known manner to a vehicle such as a bicycle, a motorbike, a car or a boat for example. Such a navigation device 200 is then removable from the docked location for portable or handheld navigation use. Indeed, in other embodiments, the device 200 may be arranged to be handheld to allow for navigation of a user.

Figure 4:
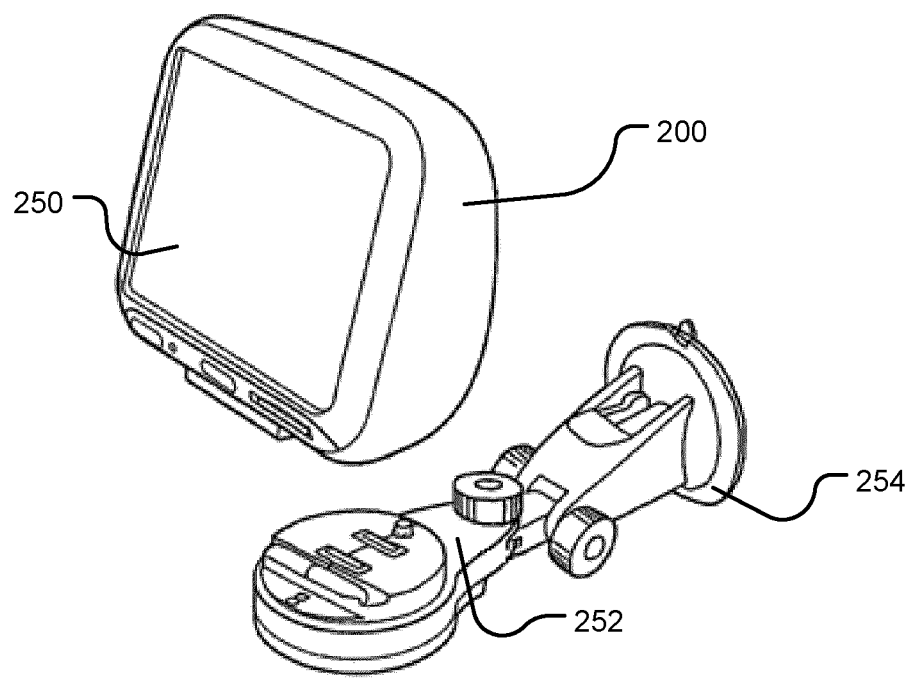
FIG. 4 is a schematic diagram of an arrangement of mounting and/or docking a navigation device.

Referring to FIG. 4, the navigation device 200 may be a unit that includes the integrated input and display device 206 and the other components of FIG. 2 (including, but not limited to, the internal GPS receiver 224, the processor 202, a power supply (not shown), memory systems 214, etc.).

The navigation device 200 may sit on an arm 252, which itself may be secured to a vehicle dashboard/window/etc. using a suction cup 254. This arm 252 is one example of a docking station to which the navigation device 200 can be docked. The navigation device 200 can be docked or otherwise connected to the arm 252 of the docking station by snap connecting the navigation device 200 to the arm 252 for example. The navigation device 200 may then be rotatable on the arm 252. To release the connection between the navigation device 200 and the docking station, a button (not shown) on the navigation device 200 may be pressed, for example. Other equally suitable arrangements for coupling and decoupling the navigation device 200 to a docking station are well known to persons of ordinary skill in the art.

Figure 5:
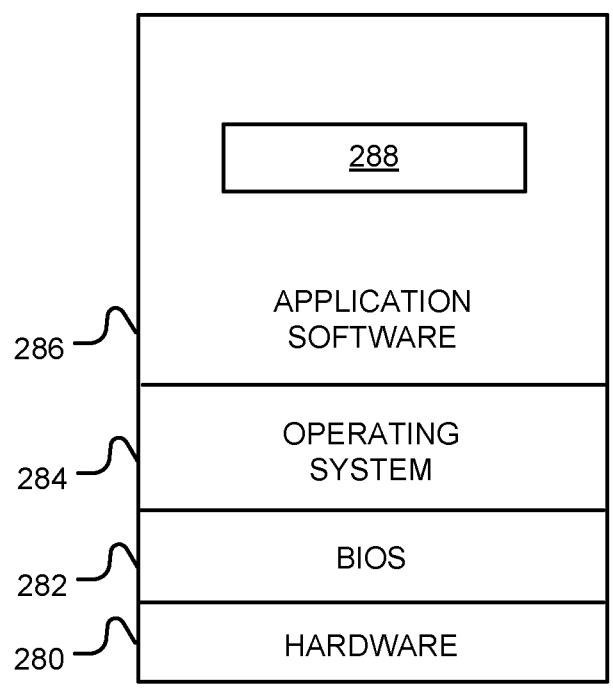
FIG. 5 is a schematic representation of an architectural stack employed by the navigation device of FIG. 3.

Turning to FIG. 5, the processor 202 and memory 214 cooperate to support a BIOS (Basic Input/Output System) 282 that functions as an interface between functional hardware components 280 of the navigation device 200 and the software executed by the device. The processor 202 then loads an operating system 284 from the memory 214, which provides an environment in which application software 286 (implementing some or all of the described route planning and navigation functionality) can run. The application software 286 provides an operational environment including the Graphical User Interface (GUI) that supports core functions of the navigation device, for example map viewing, route planning, navigation functions and any other functions associated therewith. In this respect, part of the application software 286 comprises a view generation module 288.

In the embodiment being described, the processor 202 of the navigation device is programmed to receive GPS data received by the antenna 224 and, from time to time, to store that GPS data, together with a time stamp of when the GPS data was received, within the memory 214 to build up a record of the location of the navigation device. Each data record so-stored may be thought of as a GPS fix; i.e. it is a fix of the location of the navigation device and comprises a latitude, a longitude, a time stamp and an accuracy report.

In one embodiment the data is stored substantially on a periodic basis which is for example every 5 seconds. The skilled person will appreciate that other periods would be possible and that there is a balance between data resolution and memory capacity; i.e. as the resolution of the data is increased by taking more samples, more memory is required to hold the data. However, in other embodiments, the resolution might be substantially every: 1 second, 10 seconds, 15 seconds, 20 seconds, 30 seconds, 45 seconds, 1 minute, 2.5 minutes (or indeed, any period in between these periods). Thus, within the memory of the device there is built up a record of the whereabouts of the device 200 at points in time. In some embodiments, it may be found that the quality of the captured data reduces as the period increases and whilst the degree of degradation will at least in part be dependent upon the speed at which the navigation device 200 was moving a period of roughly 15 seconds may provide a suitable upper limit. Whilst the navigation device 200 is generally arranged to build up a record of its whereabouts, some embodiments, do not record data for a predetermined period and/or distance at the start or end of a journey. Such an arrangement helps to protect the privacy of the user of the navigation device 200 since it is likely to protect the location of his/her home and other frequented destinations. For example, the navigation device 200 may be arranged not to store data for roughly the first 5 minutes of a journey and/or for roughly the first mile of a journey.

In other embodiments, the GPS may not be stored on a periodic basis but may be stored within the memory when a predetermined event occurs. For example, the processor 202 may be programmed to store the GPS data when the device passes a road junction, a change of road segment, or other such event.

Further, the processor 202 is arranged, from time to time, to upload the record of the whereabouts of the device 200 (i.e. the GPS data and the time stamp) to the server 150. In some embodiments in which the navigation device 200 has a permanent, or at least generally present, communication channel 152 connecting it to the server 150 the uploading of the data occurs on a periodic basis which may for example be once every 24 hours. The skilled person will appreciate that other periods are possible and may be substantially any of the following periods: 15 minutes, 30 minutes, hourly, every 2 hours, every 5 hours, every 12 hours, every 2 days, weekly, or any time in between these. Indeed, in such embodiments the processor 202 may be arranged to upload the record of the whereabouts on a substantially real time basis, although this may inevitably mean that data is in fact transmitted from time to time with a relatively short period between the transmissions and as such may be more correctly thought of as being pseudo real time. In such pseudo real time embodiments, the navigation device may be arranged to buffer the GPS fixes within the memory 214 and/or on a card inserted in the port 228 and to transmit these when a predetermined number have been stored. This predetermined number may be on the order of 20, 36, 100, 200 or any number in between. The skilled person will appreciate that the predetermined number is in part governed by the size of the memory 214 or card within the port 228.

In other embodiments, which do not have a generally present communication channel 152 the processor 202 may be arranged to upload the record to the server 152 when a communication channel 152 is created. This may for example, be when the navigation device 200 is connected to a user's computer. Again, in such embodiments, the navigation device may be arranged to buffer the GPS fixes within the memory 214 or on a card inserted in the port 228. Should the memory 214 or card inserted in the port 228 become full of GPS fixes the navigation device may be arranged to delete the oldest GPS fixes and as such it may be thought of as a First in First Out (FIFO) buffer.

In the embodiment being described, the record of the whereabouts comprises one or more traces with each trace representing the movement of that navigation device 200 within a 24 hour period. Each 24 is arranged to coincide with a calendar day but in other embodiments, this need not be the case.

Generally, a user of a navigation device 200 gives his/her consent for the record of the devices whereabouts to be uploaded to the server 150. If no consent is given then no record is uploaded to the server 150. The navigation device itself, and/or a computer to which the navigation device is connected may be arranged to ask the user for his/her consent to such use of the record of whereabouts.

The server 150 is arranged to receive the record of the whereabouts of the device and to store this within the mass data storage 160 for processing. Thus, as time passes the mass data storage 160 accumulates a plurality of records of the whereabouts of navigation devices 200 which have uploaded data.

As discussed above, the mass data storage 160 also contains map data. Such map data provides information about the location of road segments, points of interest and other such information that is generally found on map.

Figure 6:
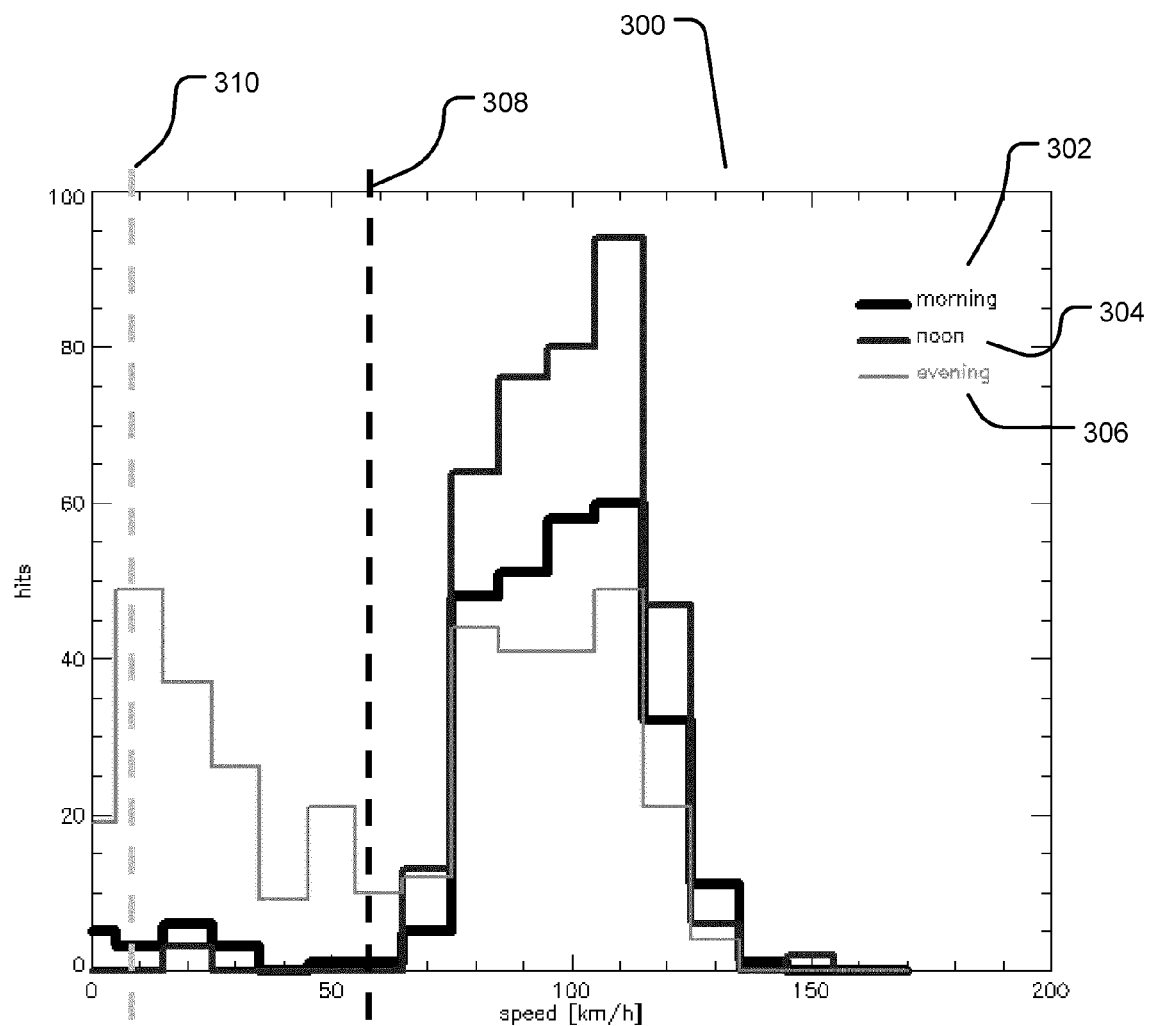
FIG. 6 is an average speed of travel across a segment histogram for three different time periods: morning, noon, and evening.

Referring now to FIG. 6, by way of background, the way in which time dependent jam probabilities, jam travel times and non-jam travel times for segments may be obtained will be illustrated. The description below is by reference to jam speed or non-jam speed, but it will be appreciated that this data may be readily converted to jam or non-jam travel times using the length of the segment.

FIG. 6 shows generally at 300 a histogram of average speeds of travel across a segment for three particular periods, morning 302, noon 304 and evening 306. The average speeds of travel across a segment, which may have been calculated from raw data such as historic travel times across the segment, are examples of historic travel data. The histogram 300 may be considered to represent historic data in the sense that the data recorded is not live data. The data is not therefore a direct result of raw data collection occurring substantially at the current time, recording actual events on the road segment within for example the last fifteen minutes. The data may however be used to predict what may be occurring on the segment at the present time in view of patterns occurring in traffic levels and behaviour.

The data for completion of the histogram 300 (historic average speeds of travel across the segment) were calculated using traces of the type described above, recorded by the server 150. If the navigation device's 200 location is known according to a trace, then the time passing between it entering and leaving the segment may be recorded. As will be appreciated, an average speed of travel across the segment can then be calculated assuming the segment distance is known.

The histogram 300 suggests that in the morning 302 and noon 304 periods there was relatively little slow moving traffic, whereas in the evening period 306 there was substantially more relatively slow moving traffic. The histogram 300 further suggests that in all three periods 302, 304 and 306 there was a substantial quantity of relatively fast moving traffic.

Shown on histogram 300 is a jam threshold speed 308 selected to be at 60 km/h. The jam threshold speed is an example of a jam condition. The jam threshold speed is the average speed of travel across the segment below which the travel is considered to have been jammed. In this embodiment the jam threshold speed was selected simply on the basis of a subjective view on what average speed should be considered jammed over the particular segment. In other embodiments, however, the jam threshold speed may be selected according to alternative criteria (e.g. a percentage of the average speed of travel across the segment during a period in the early morning, when the influence of other vehicles may be negligible, i.e. a free-flow speed). In other words, the jam threshold speed may be a selected percentage of the free-flow speed for the segment, the free-flow speed being the average speed of travel across the segment recorded during a selected low traffic period. As will be appreciated, once a jam threshold speed has been defined, all average speeds of travel across the segment below this speed are considered jammed.

Also shown on the histogram 300 is a jam speed 310 of 10 km/h. As can be seen the jam speed 310 is time independent, i.e. the same jam speed 310 is provided for all three periods 302, 304 and 306. In this embodiment the jam speed 310 has been selected to be the mode of hits below the jam threshold speed 308. It is therefore an indication of the most likely average speed of travel across the segment when there is a jam. In other embodiments the jam speed 310 may be defined differently and this is discussed later.

With reference to the histogram 300 a method of calculating time dependent jam probabilities will be explained. As will be appreciated the histogram 300 shows the total number of hits above and below the jam threshold speed 308 for each period 302, 304, 306. Consideration of these totals gives a ratio for each period of jammed versus non-jammed travelling. This in turn allows the calculation of a jam probability for each time period. A jam probability calculated in this would be an example of generated segment data. By way of example, if the ratio of jammed hits to non-jammed hits is 30:70 for a particular period, a jam probability for that period may be 30%. A calculation such as this may be expressed as a function. This jam probability may then be associated with the relevant segment as segment data, giving a jam probability for travel in a particular period (e.g. mornings). The jam speed may be used in conjunction with the jam probability to give not only the likelihood of a jam but further the likely average speed of travel across the segment in the event of a jam. In this example the jam probability is based entirely on historic data. As discussed later, jam probabilities may be calibrated based on live data.

Figure 7A:
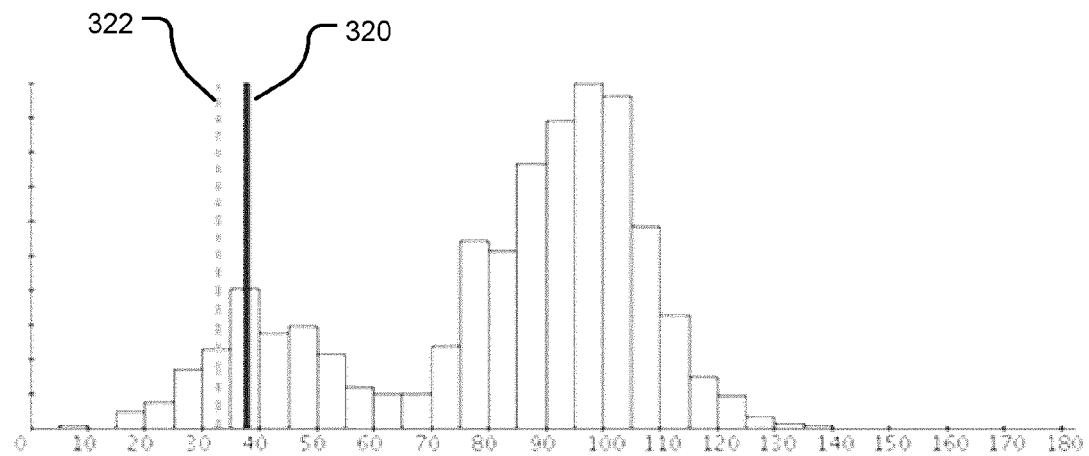
FIG. 7A is an average speed of travel across a segment histogram identifying possible jam speeds.
Figure 7B:
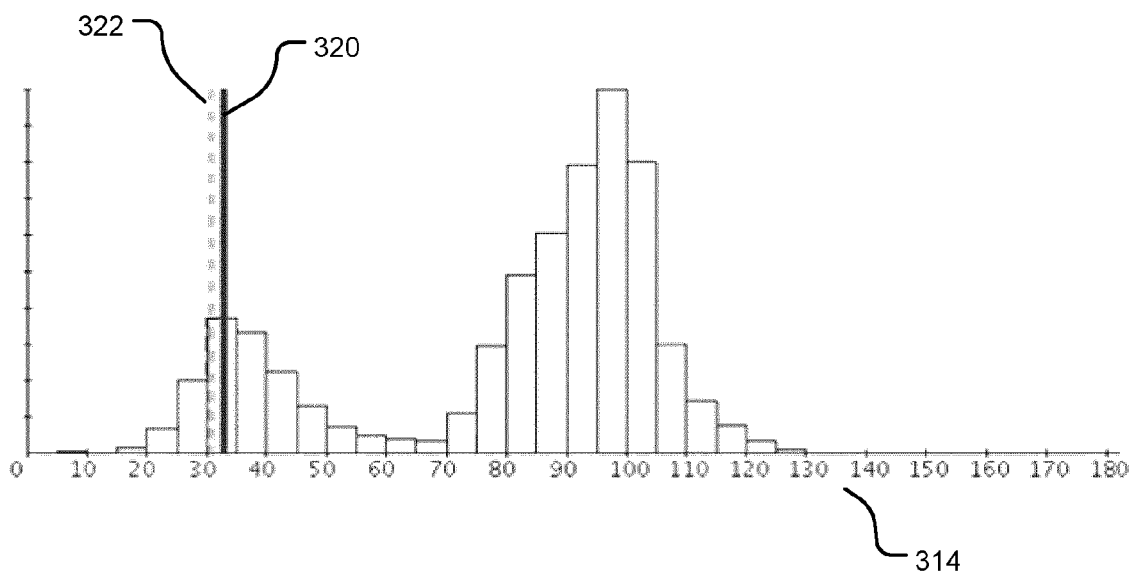
FIG. 7B is an average speed of travel across a segment histogram identifying possible jam speeds.
Figure 7C:
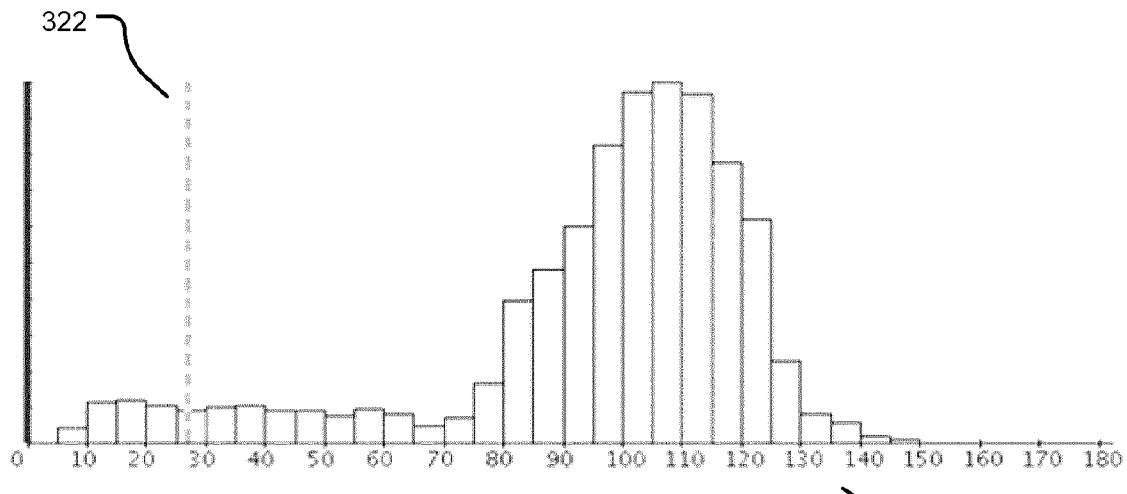
FIG. 7C is an average speed of travel across a segment histogram identifying a possible jam speed.
Figure 7D:
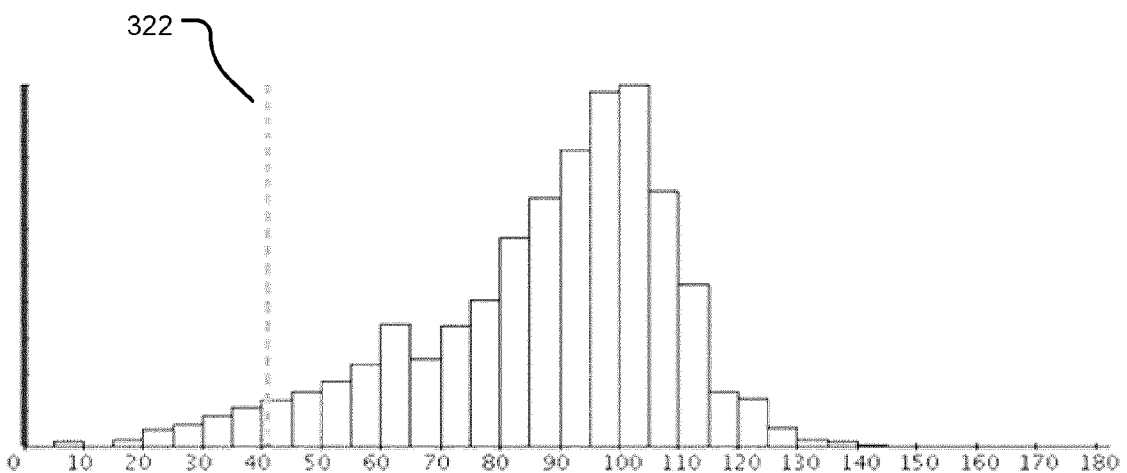
FIG. 7D is an average speed of travel across a segment histogram identifying a possible jam speed.

Referring now to FIGS. 7A-7D, alternative criteria for defining the jam speed are illustrated. FIG. 7A shows a histogram 312, FIG. 7B a histogram 314, FIG. 7C a histogram 316 and FIG. 7D a histogram 318. These histograms 312, 314, 316 and 318 each show historic average speeds of travel across a segment for a single period. As with histogram 300 of FIG. 6 they all use historic data. In both histograms 312 and 314 there is a clear low speed mode 320. Assuming that the jam threshold speed has been selected to be above the low speed mode 320, the low speed mode 320 may be particularly suitable for selection as the jam speed. For comparison a fifth percentile 322 is also shown in both histograms 312 and 314.

In both histograms 316 and 318 there is either no low speed mode or it is far less obvious. In this case in particular a percentile such as the fifth percentile 322 may be used as the jam speed.

In other embodiments there are still further options for selecting the jam speed. The jam speed may for example be an average of all average speeds of travel across the segment falling below the jam threshold speed.

Some preferred embodiments of the invention will now be described by way of example only and by reference to FIGS. 8 and 9.

The present invention uses jam and non-jam travel times and jam probabilities associated with segments of an electronic map to generate improved alternative routes, in particular based on an expected reliability of the routes under changing traffic conditions.

Before going on to describe the generation of alternative routes in more detail, some principles underlying the embodiments of the present invention, and the factors used in generating the routes, will now be described by reference to FIG. 8.

Figure 8:
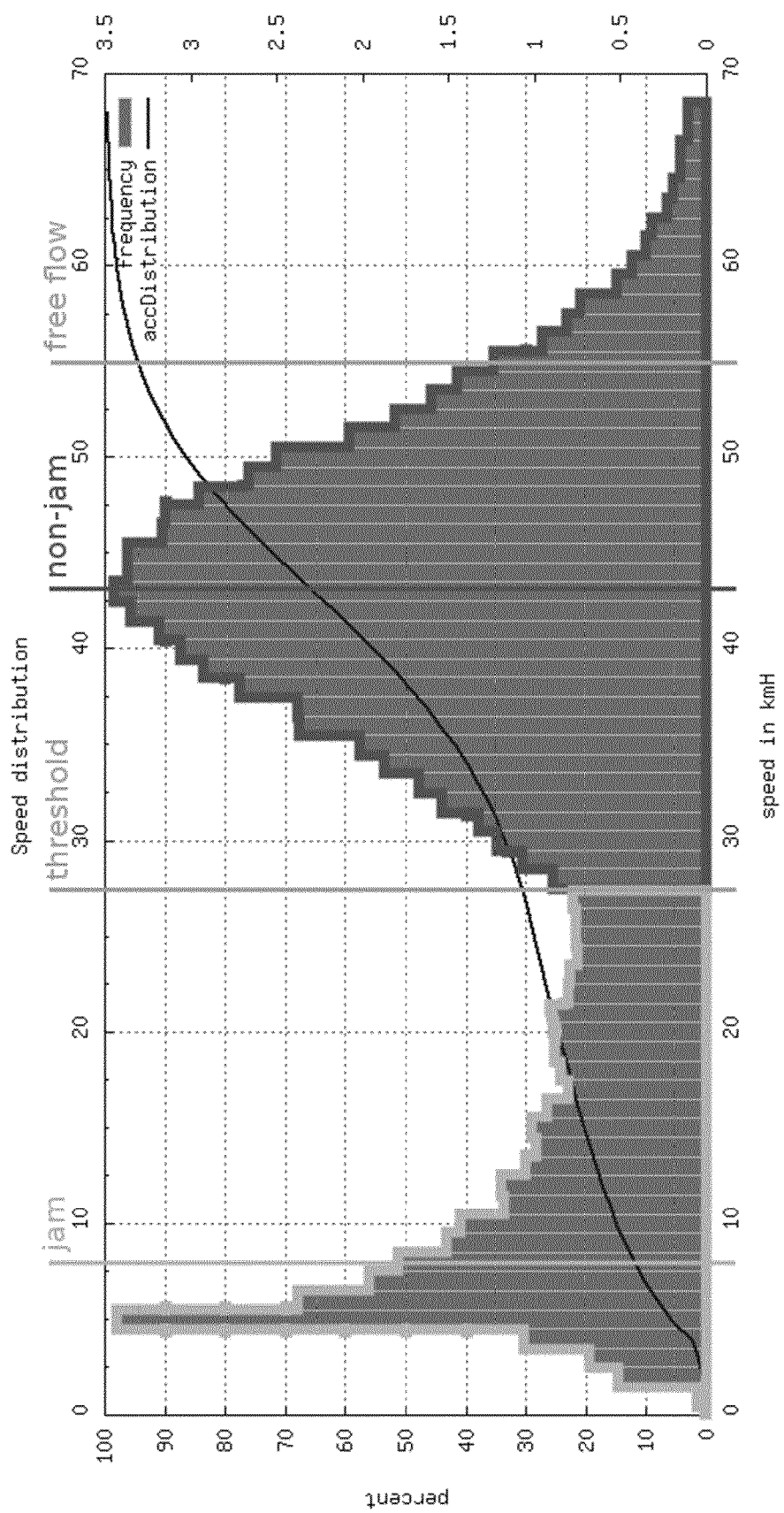
FIG. 8 is a histogram illustrating the distribution of different probe vehicles when traversing a given segment in a particular time period.
Figure 9:
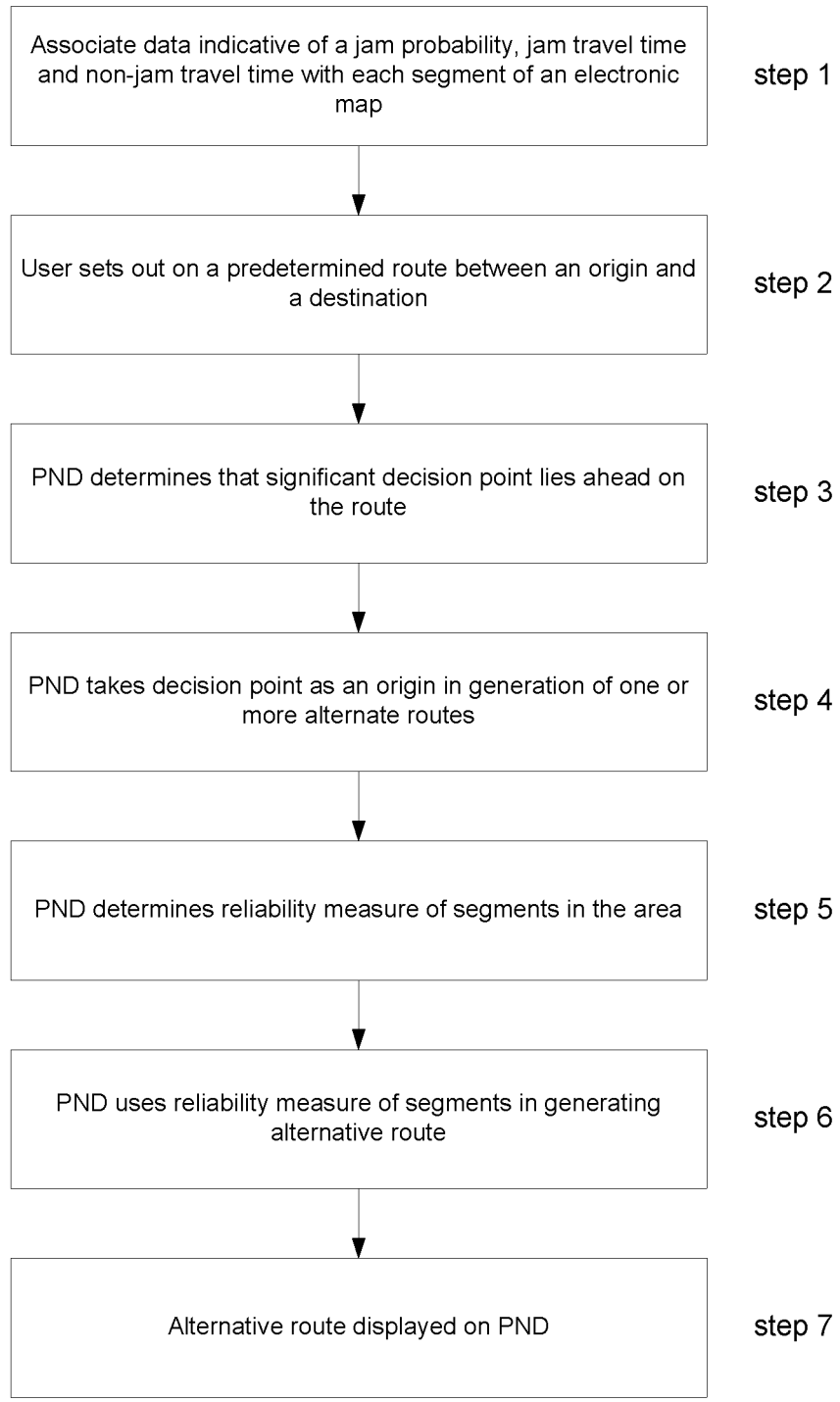
FIG. 9 is a flow chart illustrating an embodiment of the invention in which alternative routes are generated.

FIG. 8 is similar to the histograms of FIGS. 7A-7D above, and represents the distribution of the speeds of different probe vehicles when traversing a given segment in a particular time period. In this case, FIG. 8 illustrates the frequency of occurrence of different probe vehicle speeds obtained for one road segment within one specific hour of one specific day of the week over a two year period. Thus, the values obtained will be averages for this time period. It will be appreciated that corresponding values to those described below for segments, e.g. jam probability, jam travel time, non-jam travel time, etc, for other time periods may be derived from corresponding histograms based on data relevant to any other period, e.g. hour or day of the week.

The following parameters may be determined for the given segment from a histogram of the type shown in FIG. 8:

the free flow speed s, e.g. defined as a maximum speed measured in the slowest 95% of probes;

the number of jam probes, e.g. defined as a number of probes with the speed less than ½s;

the jam probability $p_j \in [0;1]$, e.g. defined as the ratio of the number of jam probes to the total number of probes;

the jam travel time $t_j$, e.g. defined as the time needed to traverse the road segment at the average speed of all jam probes; and the non-jam travel time $t_n$, e.g. defined as the time needed to traverse the road segment at the average speed of all non-jam probes.

The use of the term "e.g." above indicates that the relevant parameters need not be calculated exactly in the manner specified, which is merely exemplary, so long as they are indicative of the relevant parameter, e.g. number of jam probes, free flow speed, etc. The relevant thresholds may be set differently.

In FIG. 8, it is possible to determine a non-jam speed being a higher speed of about 43 km/h and a lower speed, the "jam speed" of around 5 km/h, which may be typical of speeds during rush hour times in jam conditions. These two speeds are average speeds. The jam travel time and non-jam travel time are obtained using the jam speed and non-jam speed.

Those probes having a speed below a certain threshold, e.g. set at 50% of the free flow speed, may be considered to be jam probes. The number of the jam probes in relation to the total number of probes yields the probability of a jam, or "congestion likeliness" on this road segment in the specific hour of a specific day of the week.

In order to obtain useful alternative routes, in accordance with the present invention, these values relating to jam and non-jam travel times and jam probabilities for a segment are used to determine a measure of the reliability of the segment under a given theoretical traffic condition at the relevant hour and day of the week (the "reliability measure"). In this case, the reliability measure is in terms of a time for traversing the segment at the relevant time. A lower value of the measure will therefore be indicative of higher reliability. It will be appreciated that a similar calculation may be performed for other time periods using the appropriate values obtained from data relating to that period. The reliability measure of the segment may also be referred to as the "reliable cost" of the road segment.

The reliability measure is calculated in accordance with the following equation:

$$t_\rho := \left(1 - \rho^{\frac{p_j}{\bar{p}_j}}\right) \cdot t_n + \rho^{\frac{p_j}{\bar{p}_j}} \cdot t_j \qquad \text{Eqn. 1}$$

In this equation $\bar{p}_j$ denotes an average jam probability for segments in the area, and $p_j$ is the jam probability for the segment in question. The average jam probability may be determined using the jam probabilities obtained for each segment in the area at the corresponding time period, e.g. same hour of the same day of the week. The average may take account of segments within a predetermined distance of the given segment. The distance might be defined by a bounding box depending on origin and destination of the route being assessed. However, other options are possible. The average may be taken as one of a limited set of values which may be used to describe the average jam probability for any segment rather than being a calculated value. In preferred arrangements the average jam probability is taken to be the same value for all segments in the "alternatives network" of segments considered in generating alternative routes. The average jam probability has the effect in Eqn. 1 of ensuring that when a segment has higher-than-average jam probability, the cost on the segment will react more quickly to an increase in the traffic level parameter, and vice-versa for segments with less-than-average jam probability.

This equation additionally uses a further parameter $\rho$, which may be referred to as a "traffic condition parameter", and is indicative of a given theoretical level of traffic. This parameter could also be seen as a reliability parameter, being used to set the desired reliability of routes/segments under traffic. This parameter may be set at a value between 0 and 1, such that when it is high, it is indicative of high levels of traffic. A road which has a low measure of reliability under these conditions may be understood to be relatively resistant to the effects of traffic even under severe traffic conditions.

According to equation 1 above, when $\rho=0$, $t_\rho$ is just the non-jam travel time $t_n$, and for $\rho=1$, $t_\rho$ is exactly the jam travel time $t_j$. If the jam probability $p_j$ on the segment matches the average jam probability $\bar{p}_j$, $t_\rho$ progresses from $t_n$ to $t_j$ with increasing $\rho$ in a linear fashion. If the segment's jam probability is lower (higher) than average, $t_\rho$ increases sub-linearly (super-linearly) with $\rho$ towards $t_j$. Eqn. 1 can be tuned with more parameters if needed, and/or the definitions of s, $t_n$, $t_j$ and $p_j$ can be tuned as needed. In particular, $t_n$ could be defined as the travel time according to real-time traffic information, and $t_j$ replaced by the maximum of travel time in jam mode and $t_n$.

By finding a route based on segments which maximises reliability under a given traffic condition or conditions as specified using the traffic parameter, e.g. minimises the reliability measure/reliable cost, routes may be found which offer relatively low travel times even when traffic is assumed to be severe. The reliability measure may be used in a cost function in a conventional manner, alone, or with terms based on other factors to be balanced in determining a route. The equation for reliability measure provides a way of representing the relationship between travel time and traffic severity on any given segment relative to other segments in the area. It is a function of both the jam probability for the individual segment, and average jam probability determined based on all road segments in the area, and the jam and non-jam times for the segment. In this way, the reliability of the segment, i.e. its travel time under a given theoretical traffic level set using the traffic parameter, can be determined. It will be appreciated that this equation takes into account not only the relative probability of a jam on a given segment, but also the degree of delay that this might incur by virtue of the jam travel time.

It will be appreciated that the above example is only indicative of one way in which such an equation may be implemented. Of course, alternative definitions for free flow speed, non-jam and jam travel time and jam probability may be used, provided that they are generally indicative of these features of a segment. For example, these could be based on different thresholds obtained from a histogram as shown in FIG. 8, or could be obtained at least in part using live traffic information.

In some embodiments the reliability measure may be used to generate routes which are particularly robust or reliable even under more severe traffic conditions. In carrying out such determinations of routes, the traffic condition parameter $\rho$ may be set by a user, e.g. using a slider represented on the display of a navigation apparatus, with the reliability measure for segments then being based on this traffic condition. In this way, a route may then be generated using the resulting reliability measures obtained for segments under this specified traffic condition, to obtain routes optimised for travel assuming the specified level of traffic. For example, if $\rho$ was set high, i.e. close to 1, the route obtained would be optimised for travel time assuming that traffic were particularly bad. In this situation, roads with higher jam probability and lower jam speed would be avoided. In some aspects of the invention this could be used to provide routes based on this further user specified parameter, i.e. traffic resistance, which need not be alternative routes. For example this might be used to generate alternative routes to be followed subsequently.

However, in preferred embodiments, the reliability measure is used in the generation of alternative routes.

By way of background, users may use a PND for a variety of reasons. In some situations, the user may be driving in a well known area, where they do not rely upon the PND for guidance along a route, but may use the PND to monitor traffic levels, and, if appropriate suggest a faster alternative route. Such faster alternative routes would be based upon current traffic levels that are received by the device via various channels e.g. from a traffic server. A typical PND might continuously search for a faster route in the background while the driver is navigating the original route.

Merely providing a faster alternative route in the event of traffic has some limitations. Many drivers would welcome the opportunity to make their own route decision in a traffic situation based on their own local knowledge of the road network, and any real time traffic information that is available. However it is not realistic to provide the user with all traffic information on an area map. Conventional techniques which might only provide an indication of traffic on a current route and a faster alternative just found may not satisfy a user, who may wish to investigate whether another route known to them might be less affected by traffic.

In embodiments of the invention, the PND continually checks for alternative routes during progress along a given predetermined route. In particular, when a significant decision point along the predetermined route is approached, alternative route options are generated, and displayed to a user before the user reaches the decision point. The travel time and traffic information for each alternative route may also be displayed to allow a user to make an informed decision as to whether to adopt one of the alternative routes or continue on the original route.

By consideration of the jam probabilities associated with segments in the road network, and, in preferred embodiments, the reliability measure, the present invention provides a way of identifying useful alternative routes on the basis of traffic resistance, and selecting those routes from the vast number of possible alternative routes which might exist during navigation along a given predetermined route. In particular, by consideration of jam probability, rather than merely current traffic conditions, the invention provides the ability for a user to select a route which will hopefully be reliable in terms of time to destination, even if traffic situation were to worsen after travel along the route has commenced. In contrast a route determined to be the fastest under current conditions may not remain the fastest if traffic conditions worsen.

A preferred embodiment of the invention involving the generation of alternate routes will now be described by reference to FIG. 9, which is a flow chart setting out the basic steps of such a process.

In step 1, data indicative of a jam probability, jam travel time and non-jam travel time is associated with each segment of an electronic map in respect of each of a plurality of different time periods. For example, a set of such data may be associated with each segment in respect of each hour long period on each day of the week. The data may be obtained in any of the manners discussed above. The data is stored in association with the data representing the respective segment in the electronic map. The data may be stored as part of the electronic map data held on a PND memory. It will be appreciated that in other arrangements such information might alternatively be stored on a server which is accessible to a PND, or may be stored in a combination of locations, or via any other suitable arrangement.

In step 2, a user sets out on a first predetermined route between a first route origin and a destination, being guided by the PND. This route is a fastest route calculated in a conventional manner between the origin and destination under conditions current for the time of travel.

As the user follows the predetermined route, the PND determines that a significant decision point lies ahead on the route—step 3.

The PND takes this decision point as an origin in a calculation of one or more alternate routes to the original destination of the first predetermined route—step 4. The alternate routes are determined using the reliability measure calculated using equation 1 as described above.

The PND determines the reliability measure i.e. reliable cost of segments in the area between the origin and destination using Eqn. 1—step 5. In this calculation, the traffic condition parameter $\rho$ is automatically set at a suitable level for this calculation, so as to be indicative of a certain traffic severity. As already described, the reliability measure takes into account the jam probability of individual segments, their jam and non-jam travel times, and additionally an average jam probability of segments in the area, and is in terms of a travel time for traversing the segment under the given traffic condition. Of course, in other arrangements, the reliable cost may already be stored in association with segments as a segment attribute, based on a given traffic parameter level. However, by obtaining the reliability measure as part of the route generation method, the invention provides greater flexibility in choosing the traffic level parameter, if desired, in relation to each route generation step, or to differ for different segments, etc.

Once the reliability measure of the segments in the area is found, this is used as a component in a cost function used to determine an alternative route—step 6. The PND determines an alternative route on the basis of this reliability measure. By minimising the reliability measure, a route with maximum reliability for a given traffic condition identified by the traffic parameter will be found. This route will correspond to the route which, under the given traffic conditions, may be considered to be least affected in terms of travel time by traffic of the level set by the traffic condition parameter.

This alternative route is presented to the user on the PND display—step 7. Traffic information and travel time for the route may additionally be displayed.

Further alternative routes may be determined, for example having a reliability above a certain threshold, or in accordance with any other criteria, or based on different levels of the traffic parameter etc.

In this way, the user is presented with an alternative route which can be considered to be reliable in the event of traffic being present. Depending upon the level to which the traffic condition parameter was set, the route may be particularly reliable even under high levels of traffic.

The user then has the option to select this alternative route, which will then become the new predetermined route being followed, or could continue with the existing route.

The method may be repeated for subsequent decision points to present the user with alternative routes having greater traffic resistance in a similar manner. A user might decide to follow one of these routes if traffic was shown on the current route ahead. If the user takes an alternative route, the method may be repeated in relation to a decision point along the route. While the current route might be a fastest route under certain conditions, it might not be so reliable under higher levels of traffic, such that the user would prefer to switch to an alternative reliable route.

In obtaining alternative routes, in contrast to determining a fastest route initially, only a more limited "alternatives network" of segments may be considered. This may limit the alternative routes generated to a reasonable number of more useful routes. The alternatives network may be determined by consideration of the segments and/or decision points along a predetermined route being followed, and/or the first fastest route. Route determination may be carried out based on conventional algorithms, e.g. based on the Dijkstra algorithms.

The destination for an alternative route need not be a destination of a predetermined route being followed, i.e. a first route destination but might be a position, e.g. decision point, closer to the alternative route origin than that original first route destination. This would assume that the original route may be rejoined at that point.

Of course, rather than being determined on the fly as en route alternatives, alternative routes could be generated as part of an initial route planning stage before travel along a route commences, with the user being able to choose one of the routes in preference to a fastest route. The origin and destination for determination of the alternative route will then typically correspond to those of the first route.

In another embodiment Eqn. 1 and the reliability measures could simply determine a route taking into account traffic reliability. For example a user could set the traffic condition parameter to a given level, such as a high level, in order to result in a route being generated that is optimised for travel time assuming that traffic is particularly bad. In this situation, the route would not need to be an alternative route, and could be a route that is being planned such that the route was generated before departure of the user in a conventional manner. The user might set the traffic parameter using a slider on a graphical interface of a PND, for example.

Some further details of ways in which alternative routes might be implemented will now be provided.

The way in which the reliable alternative routes may be generated using the traffic reliability measures may vary, in particular in relation to the level of the traffic parameter where automatically set. In one option, Eqn. 1 may first be performed with $\rho=0$. This would return the currently fastest route R. This may effectively regenerate the remainder of a fastest route being followed, but provides a check that this is still the fastest route in view of current conditions. Now $\rho$ may be increased only on segments found on route R, and a new optimal route determined according to a new cost function taking into account the traffic reliability measure of the segments. Increasing the reliability parameter only on those segments which are already part of such an "alternative network" may push the algorithm to find new segments which become relevant if traffic is bad on the segments already covered. In each situation, it may be attempted to find a new alternative route which can be used in case of traffic incidents on previously computed routes.

Of course various more complex arrangements may be used in increasing $\rho$ (i.e. the amount in which $\rho$ is increased on the last computed route R), the segments that are added to the alternative network in previous iterations, and the segments entering or leaving p and/or a current alternative network.

It will be appreciated that in addition to suggesting route alternative routes determined on the basis of jam probability as discussed herein, the present invention does not exclude a further search being carried out for a new fastest alternative route in a conventional manner to compliment this step. This may be carried out as part of the process of calculating alternative routes as described above, by setting the traffic parameter level appropriately.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of generating a route in an area covered by an electronic map, the map comprising a plurality of segments representing navigable segments in the area covered by the electronic map, each segment being associated with jam probability data representative of a likelihood of a jam on the segment, the method comprising:

exploring routes between an origin and a destination in the area to determine a minimum cost route, wherein the cost of each of a plurality of segments is determined using a cost function such that the cost for a segment is based at least on a reliability measure indicative of an expected reliability of the segment under a theoretical traffic condition, said reliability measure being obtained using the jam probability data associated with the segment, and wherein the theoretical traffic condition is selected from a plurality of predefined traffic severity levels; and outputting said determined minimum cost route as the route between the origin and the destination.

2. The method of claim 1, wherein the jam probability data associated with a segment is in respect of a given time period, optionally wherein each segment is associated with data indicative of a plurality of jam probabilities, each being in respect of a different given time period.

3. The method of claim 1, where each segment of the electronic map is further associated with: jam travel time data representative of the time to traverse that segment when it is considered jammed; and non-jam travel time data representative of the time to traverse that segment when it is not considered jammed, and wherein the reliability measure is further obtained using the jam travel time data and the non-jam travel time data, such that said reliability measure is representative of an expected time to traverse the segment under the theoretical traffic condition.

4. The method of claim 3, wherein the jam travel time data and non-jam travel time data is in respect of a given time period, optionally wherein each segment is associated with data indicative of a plurality of jam travel times and data indicative of a plurality of non-jam travel times, each of the plurality of jam travel times and the plurality of non-jam travel times being in respect of a different given time period.

5. The method of claim 1, wherein the reliability measure for a segment is further obtained based on the likelihood of a jam on the segment relative to the likelihood of a jam on other segments in the area.

6. The method of claim 1, wherein the theoretical traffic condition is specified by a user.

7. The method of claim 1, further comprising obtaining a plurality of reliability measures for each of the plurality of segments, wherein each reliability measure is indicative of an expected reliability of the segment under a different theoretical traffic condition, and generating a route between the origin and the destination for a set of traffic conditions using reliability measures for different segments determined with respect to different theoretical traffic conditions.

8. The method of claim 1, further comprising obtaining a plurality of reliability measures for each of the plurality of segments, wherein each of the plurality of reliability measures is indicative of an expected reliability of the segment under a different theoretical traffic condition, and generating a plurality of routes between the origin and the destination, wherein each of the plurality of routes is generated using a different one of the plurality of reliability measures for the plurality of segments.

9. The method of claim 1, further comprising displaying the generated route to a user.

10. The method of claim 1, further comprising providing a set of navigation instructions for guiding a user along the generated route.

11. The method of claim 1, wherein the generated route between the origin and the destination is an alternative route to a first route between a first route origin and a first route destination in the area, said method further including generating the first route, and wherein the origin of the alternative route is the first route origin or a location on the first route, and the destination of the alternative route is the first route destination or a location on the first route.

12. A non-transitory computer readable medium comprising computer readable instructions which, when executed by a computer, cause the computer to perform the method of claim 1.

13. A system for generating a route in an area covered by an electronic map, the map comprising a plurality of segments representing navigable segments in the area covered by the electronic map, each segment being associated with jam probability data representative of a likelihood of a jam on the segment, the system comprising:

one or more processors operable to:

explore routes between an origin and a destination in the area to determine a minimum cost route, wherein the cost of each of a plurality of segments is determined using a cost function such that the cost for a segment is based at least on a reliability measure indicative of an expected reliability of the segment under a theoretical traffic condition, said reliability measure being obtained using the jam probability data associated with the segment, and wherein the theoretical traffic condition is selected from a plurality of predefined traffic severity levels; and output said determined minimum cost route as the route between the origin and the destination.

14. The system of claim 13, where each segment of the electronic map is further associated with: jam travel time data representative of the time to traverse that segment when it is considered jammed; and non-jam travel time data representative of the time to traverse that segment when it is not considered jammed, and wherein the reliability measure is further obtained using the jam travel time data and the non-jam travel time data.

15. The system of claim 13, wherein the system is a portable navigation device or a server.

* * * * *

UNITED STATES PATENT AND TRADEMARK OFFICE
CERTIFICATE OF CORRECTION

Page 1 of 1

PATENT NO. : 9,459,106 B2
APPLICATION NO. : 14/411625
DATED : October 4, 2016
INVENTOR(S) : Felix Godafoss König It is certified that error appears in the above-identified patent and that said Letters Patent is hereby corrected as shown below:

On the Title Page

Item [73] Assignee should read as follows:
TomTom Navigation B.V
Amsterdam, (NL)

Signed and Sealed this
Eighteenth Day of April, 2017

Michelle K. Lee
*Director of the United States Patent and Trademark Office*